(12) United States Patent
Schein et al.

(10) Patent No.: US 6,226,623 B1
(45) Date of Patent: May 1, 2001

(54) GLOBAL FINANCIAL SERVICES INTEGRATION SYSTEM AND PROCESS

(75) Inventors: Arthur A. Schein, Rockville Center, NY (US); Paul Aron, Scotch Plains, NJ (US); Dan A. Demeter, Woodmere, NY (US); Faraz Ataie, New York, NY (US); Frank Bamberger, Brooklyn, NY (US); John McGlynn, Stamford, CT (US); Florence Musalo, Manhasset, NY (US); Margot Paul, Harrington Park, NJ (US); John Poplizio, Milford, CT (US); Lucila (Uchie) Rico, New York, NY (US); Michael Tsien, Tuckahoe, NY (US); Michael Yorke, Port Washington, NY (US)

(73) Assignee: Citibank, N.A., New York, NY (US)

( * ) Notice: Subject to any disclaimer, the term of this patent is extended or adjusted under 35 U.S.C. 154(b) by 0 days.

(21) Appl. No.: 09/077,458

(22) PCT Filed: May 23, 1997

(86) PCT No.: PCT/US97/08413

§ 371 Date: May 29, 1998

§ 102(e) Date: May 29, 1998

(87) PCT Pub. No.: WO97/43893

PCT Pub. Date: Nov. 27, 1997

Related U.S. Application Data

(60) Provisional application No. 60/018,195, filed on May 23, 1996.

(51) Int. Cl.[7] ................................................. G06F 17/60
(52) U.S. Cl. ..................... 705/35; 709/217; 709/218; 709/230; 709/238
(58) Field of Search ................. 705/35, 36; 709/217, 709/218, 219, 230, 238

(56) References Cited

U.S. PATENT DOCUMENTS

| | | | |
|---|---|---|---|
| 4,346,442 | * | 8/1982 | Musmanno .............................. 705/36 |
| 4,376,978 | * | 3/1983 | Musmanno .............................. 705/36 |

(List continued on next page.)

Primary Examiner—Edward R. Cosimano
(74) Attorney, Agent, or Firm—George T. Marcou; Kilpatrick Stockton LLP

(57) ABSTRACT

A global standard messaging system and process for allowing customers to access a full range of global financial services using a variety of access points. The system includes a global communications network that integrates customer information and makes the information accessible from remote locations. The system includes a comprehensive database assembled from diverse sources and systems and processes for retrieving the information from the central database in a meaningful and practical way. The system includes several levels of access communications as well as built-in flexibility so that it can be accessed by a variety of remote systems of varying degrees of complexity and language. System and process permit rapid communication among worldwide users of the service as may be desired by industries relating to the transfer of finances.

20 Claims, 13 Drawing Sheets

U.S. PATENT DOCUMENTS

| | | | | |
|---|---|---|---|---|
| 4,597,046 | * | 6/1986 | Musmanno | 705/36 |
| 4,674,044 | * | 6/1987 | Kalmus et al. | 705/37 |
| 4,679,191 | | 7/1987 | Nelson et al. | 370/355 |
| 4,774,663 | * | 9/1988 | Musmanno et al. | 705/36 |
| 5,025,373 | * | 6/1991 | Keyser, Jr. et al. | 380/24 |
| 5,126,936 | * | 6/1992 | Champion et al. | 705/36 |
| 5,177,342 | * | 1/1993 | Adams | 235/379 |
| 5,231,569 | * | 7/1993 | Myatt et al. | 705/38 |
| 5,265,207 | * | 11/1993 | Zak et al. | 712/15 |
| 5,270,922 | * | 12/1993 | Higgins | 705/37 |
| 5,283,829 | * | 2/1994 | Anderson | 380/24 |
| 5,339,392 | | 8/1994 | Risberg et al. | 345/333 |
| 5,410,684 | | 4/1995 | Ainsworth et al. | 714/18 |
| 5,424,938 | * | 6/1995 | Wagner et al. | 705/42 |
| 5,455,407 | * | 10/1995 | Rosen | 235/380 |
| 5,485,370 | | 1/1996 | Moss et al. | 709/217 |
| 5,496,991 | * | 3/1996 | Delfer, III et al. | 235/379 |
| 5,530,809 | * | 6/1996 | Douglas et al. | 709/250 |
| 5,560,005 | | 9/1996 | Hoover et al. | 707/10 |
| 5,644,727 | | 7/1997 | Atkins | 705/40 |
| 5,857,077 | * | 1/1999 | Nakagaki et al. | 709/238 |

* cited by examiner

GLOBAL FINANCIAL SERVICES INTEGRATION SYSTEM AND PROCESS

This application is a 371 of PCT/US97/08413 filed May 23, 1997 and also claims the benefit of U.S. Provisional No. 60/018,195 filed May 23, 1996.

NOTICE OF COPYRIGHTED MATERIAL IN DISCLOSURE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to financial transaction systems, and in particular, to an integrator, i.e., a system and process that allows customers to access a full range of global financial services using a variety of access points. More particularly, this invention relates to the architecture of a global standard messaging service that permits rapid communication among worldwide users of the service as may be desired by industries relating to the transfer of finances and demographic data. Furthermore, the invention relates to the architecture of a communications network as may be required by the banking industry in obtaining customer demographic information, processing this information and relaying back changed customer demographics as is often required by financial service providers. In addition, the present invention: assists in the creation of homogeneous service from heterogeneous components; facilitates easy 'plug 'n play' of new products and services; presents interfaces to distribution points and service provider components that will be stable in the face of infrastructure changes; simplifies complicated financial transactions involving demographic data; provides very high levels of integrity and reliability for the end-to-end fulfillment of business requests; and enables applications to communicate the appropriate level of business language be it customer oriented, product oriented and the like.

BACKGROUND OF THE INVENTION

In recent years, financial institutions have become increasingly diversified. Banks, for example, now offer a wide variety of products and services not previously available. These new products and services fall into two broad categories—new technologies for interacting with the financial institution and new financial services or "products" offered by the financial institution.

From the customer's point of view, there are certain access points (or, from the bank's perspective, "distribution points") through which the customer may access the bank's services. Historically, the principal access point was a teller. But recently, there has been a proliferation of automated access points including the now ubiquitous automatic teller machines and customer activated terminals (ATMs and CATS) and, more recently, screen phones, personal computers configured for banking, personal digital assistants, voice response systems, smart cards, teller workstations and banking staff terminals. Technology in existence today allows bank customers to access their banks from any place at any time and offers tremendous efficiencies for the bank. However, to achieve these benefits, customers must be willing to use these automated alternatives to human tellers. One way of encouraging use of automated systems is to make the systems as user friendly as possible. To this end, automated systems should be able to process business language requests such as "How much money do I have in the bank?"

A business problem results from a business transaction request along the lines of "show me all the funds I have in the bank" or "move $100 from my checking account to my savings account" or some similar statement that shows up at the distribution or access point. From the bank's point of view, these business language requests must be processed by discrete "service providers" that handle check withdrawal authorization or mortgage loan processing or securities transactions, for example. These service providers are typically not capable of handling business language requests. The service providers tend to specialize. For example, a bank may have a mortgage processor, a securities processor and so on. Many banks outsource certain services, such as securities. As a result, none of these individual systems are aware of or care about the relationship, i.e., the fact that the customer has both the checking and the securities relationship with the bank. Another example is the transfer of money from checking to savings. If checking and savings are handled by discrete service providers, one service provider wants to know "debit $100" and another service provider wants to know "credit $100." The service providers don't really care about the relationship or what the source or destination of funds is, the providers only care about one direction of the transaction. In short, there is a gap between the access or distribution points and the service providers. There is need for a system and process that bridges this gap, i.e., something in the middle that has awareness of how to balance the whole thing together.

In addition, different service providers and access points can't speak with different protocols or languages. One understands screen formats and another one understands messages according to other protocols homegrown or otherwise. There is a need for a way of normalizing or flattening them all out to common language so they can interact with each other.

Financial institutions have also begun to offer a broader range of traditional banking accounts as well as investment and financial services. This ordinarily requires even more service providers.

There have been previous efforts to integrate financial services. For example, U.S. Pat. No. 5,424,938 ('938), to Wagner et al., discloses an interface system for a plurality of payment networks providing each user with a display of data necessary and applicable to complete a desired transaction. The interface system is accessed from a remote computer terminal and is disclosed for use in monetary transactions. In addition to providing a display, the system also allows the remote access user to perform transactions within the accessed account. The Wagner et al. preferred embodiment is summarized in 10 of FIG. 1 of patent '938, wherein payment networks including the Federal Reserve Bank 16 and FEDWIRE network for facilitating transfer of funds and securities between depository institutions 16 and the Society for Worldwide Interbank Financial Transfers (SIFT) network 20 are accessed by a bank housing a central computer 12. In addition, the central computer also provides access to the networks to customers having computers 28 with communications capabilities.

U.S. Pat. No. 5,126,936 ('936), to Champion et al., discloses a computer interface to a plurality of banking users. The interface comprises an information management system for a disclosed use in investment banking. The system, as summarized in FIG. 2 of the '936 patent, provides banks, brokers, and remote modem users with access accounts for deposits, investments and the like. Although disclosed primarily for investment purposes, the system is intended to be 'goal oriented' according to particular markets to be invested in. Therefore the system provides some market demographic information (as may be related to the investment) to the user.

U.S. Pat. No. 5,455,407 ("407"), to Rosen, discloses an electronic banking system comprising electronic money and customer demographics to be exchanged electronically among banks and clearing houses. Customer accounts of any user bank can be accessed and manipulated according to information entered from a remote location. A summary of the preferred embodiment is provided in FIG. 1 of the '407 patent. The monetary system can be accessed remotely and in person.

U.S. Pat. No. 5,025,373, to Keyser, Jr. et al. discloses a remote banking terminal controlled by a host bank. Account information and financial services, although controlled by the host bank, are made available to the authorized customer. In addition, banks and related financial institutions other than the host bank can be provided with the remote banking terminal for access to account information.

U.S. Pat. No. 5,231,569, to Myatt et al., discloses remote banking access to customers. The bank accounts are accessed by 'credit card' styled cards containing customer information on magnetic strips. The remote locations are then provided with customer demographic information including account funds and credit information. The remote locations are then provided with authorizations to credit moneys that are then debited to the customer account.

U.S. Pat. No. 5,177,342, to Adams, discloses a transaction approval system. The system verifies to remote users information as to customer demographics. This information may include financial and credit information. The customer demographics are available to the end user only in a read-only format and do not provide for direct customer account manipulation beyond authorization.

U.S. Pat. No. 5,496,991, to Delfer, III et al. discloses a database management system wherein pre-authorizations of monetary transfers are obtained from clients to initiate monetary transfers into other accounts. Verification of transfers are remitted to the sender. Although containing some customer demographics, the information shared with the user of the system is limited to the account and the potential for a monetary transfer. In addition, the manipulation of accounts is limited to credits and debits.

U.S. Pat. No. 5,283,829, to Anderson, discloses a system for banking via the telephone. The system includes verification of authorization of the client user and normal banking services. Although this system provides some customer demographics to authorize clients, the demographics are limited to authorized users to ensure that the customer controls access to the information.

The prior art references described above differ from the instant invention in, among other things, concentrating on the transfer of funds in payment networks rather than customer demographics as a product. As such the systems use different selection logic software/hardware than required by the instant invention.

In addition, the present invention is also directed to a data model that reflects the structure of a customer's relationship to the bank. The traditional marketing approach of banks has been to try to enroll customers in new accounts, typically checking or savings accounts. Then, when the bank offers additional financial products or services, the bank tries to cross sell new accounts to customers having existing accounts with the bank. Often, banks can offer special pricing based on a customer's "relationship" with the bank. In this context, "relationship" can refer to a customer's own accounts with the bank or the accounts maintained by family members or close relatives. For example, it may be advantageous to the bank to offer special pricing to the in-laws of very wealthy customers even if those in-laws might not qualify for special pricing on their own.

One barrier to traditional cross selling of new accounts and relationship pricing is the inability to identify certain relationships that might exist. In a large financial institution, for example, separate systems are typically maintained for the various products. Thus, it is readily apparent that a customer that has a low savings balance also has a large investment portfolio with the bank. In addition, the customer must repeatedly provide the bank with the same data. This is very inconvenient and inconvenience is a significant obstacle in marketing of financial services.

Financial service is very much an inertia business. Once a customer opens an account, he or she is unlikely to change that account because of the effort involved. Most people don't shop for financial services. Instead, something in a customer's life occurs to cause a customer to make a change or be open to a change. There are moments in life when inertia is overcome; either by moving, death, formation of a family, a customer gets so angry at something that the customer decides to make a change, or some other event occurs. Thus, at the moment a customer opens an account they are open to new components, but it is difficult to open a customer up again. For this reason, cross selling financial services is very difficult. Once a person has a set of accounts, then something's got to happen in their life to cause them to open up another account.

To overcome these obstacles, banks now try to build a relationship with the customer rather than opening stand alone accounts for the customer. Studies have shown that as a customer's relationship with a bank broadens, the customer's balances increase. As a consequence, there is a need to truly understand the relationship of a customer to the bank.

There have, of course, been attempts to provide linked account structures in the past. The Citicard account, introduced in 1976 and 1977, was the first account that allowed four or five accounts to be mechanically linked together. A simple transactional account, short term savings, day-to-day savings, and 90-day savings, checking and checking plus line of credit were all linked in the Citicard account. Over the next ten years, other banks copied this approach and began offering "linked accounts," which are essentially transactional banking accounts with some saving components and perhaps a line of credit—a very traditional banking product.

Another significant development was the asset management accounts offered by certain brokerage firms. These accounts offered a plurality of securities components in a single account. The brokerage firms were not, however able to offer traditional banking services. One example is Merrill Lynch's cash management account (CMA). Aspects of this account are described in U.S. Pat. Nos. 4,346,442 to Musmanno; U.S. Pat. No. 4,376,978 to Musmanno; U.S. Pat. No. 4,597,046 to Musmanno et al.; U.S. Pat. No. 4,674,044 to Musmanno et al.; U.S. Pat. No. 4,774,663 to Musmanno et al. and U.S. Pat. No. 5,270,922 to Higgins. The account offered by Merrill Lynch was limited to securities transactions and did not include full banking products.

Similarly, when a customer opens a brokerage account, there is no need to open a separate account for trading equities or for trading fixed income.

The next development in the evolution of Citibank's account was the so-called asset network account that included a full range of brokerage services and, in addition, full banking services. This form of account originally known as FOCUS has become known as the CITIGOLD Account. This account, like brokerage accounts, was intended for sophisticated investors. The central feature of the account was sweeping funds into a money market account on a daily basis. Such an account is not, however, suitable for a broad market account that includes unsophisticated investors. The CITIGOLD was an elite account intended for sophisticated investors.

The CITIGOLD Account system introduced the idea of integration and consistent presentations across the entire range of customer access points, including ATM machines, automated voice response systems, phone operators, staff screens, home banking on a computer, home banking on a screen phone, etc. In other words, in every contact with the financial institution, the customer sees the same presentation of the account and the same capability to do the transactions.

Another step in the evolution of the Citibank account was the CITIONE account, introduced in the early 1990's. This account permitted linking of transaction accounts, certain traditional banking accounts and bank saving accounts so the customer could access all these accounts. In some regions the CITIONE account included securities or loan services such as line of credit services.

With the CITIONE account, customer's accounts could be linked together randomly so that the financial institution's different products and services could be linked together and appear on a customer's statement. This was done on an ad hoc basis depending on a customer's desires. The basic features available in the United States were checking, day-to-day savings, and insured money market accounts, certificates of deposit (CDs) and credit cards.

The next step in the evolution was the Citibank Money Management Account (CMMA), introduced around January 1993. The CMMA allows customers to link separate accounts and to perform a wide variety of financial transactions including traditional banking activities, brokerage activities and loan activities. Again, individual customer accounts could be linked to form an ad hoc mixture of product features. The system categorized those features within categories such as "your money in the bank," "securities," "borrowing and loan," "credit cards" and the like. Among other things, the CMMA allows banking customers the convenience of "one-stop" shopping. Efforts were also made to provide consistent presentation. For example, on the screen phone and in personal computing banking, the top menu was made to look like the same menu on an ATM machine. However, after the initial screen, the systems diverged.

Notwithstanding the opportunities offered by the CITIONE and CMMA accounts, there is still significant room for improvement. Specifically, the present inventors recognize that while some of the infrastructure is in place, the understanding and concept of a single account that includes all of these features has not yet been achieved. The accounts were still linked on an ad hoc basis and customers were required to open up individual accounts. This required effort in educating customers about these accounts and in selling these accounts.

As with technological advances in remote delivery products, these new accounts offer the possibility of realizing improved customer services and significant operating efficiencies and reduced cost. Again, however, the potential benefits to be obtained from using an integrated financial system such as the CMMA have not yet been fully realized.

As noted above, the present invention is also directed to a data model that reflects the structure of a customer's relationship to the bank. To anticipate a customer's needs and support targeted marketing, a service provider must know its customer. Knowing one's customers is also important for improved customer service, another proven way of getting and keeping new customers. Since truly understanding a customer's relationship with a bank becomes more difficult when the number of customers increases and the frequency of each customer's contact with a particular employee decreases, the size of a large financial institution's customer base can present an obstacle to some marketing efforts. In the financial community today, a large financial institution may have several million households and customers each with a unique set of accounts. The data available for these households, customers, and accounts is so massive, that it has heretofore not been fully used for marketing campaigns.

In an effort to deal with a large customer database, businesses traditionally maintain customer records. In some cases these records are in the form of simple paper records, but recently electronic records have become common originally, separate data storage was used for each electronic record keeping application. Thus, each department in a financial institution, for example, would have a program that created and maintained records needed for its purpose. The problem with this approach is that information must be extensively duplicated. For example, a customer's name and address might appear in separate files in several separate departments.

There are other problems with application specific data storage. Since a customer's information is entered in more than one file, any change in status must be entered into each file, often by different people. Over time the accuracy and uniformity of the data deteriorates. In addition, the use of application specific data storage requires more data entry and more storage space.

The concept of a database, introduced more than twenty years ago, has come a long way toward eliminating these problems. In a database, data is stored in a central location so that there is no duplication of data. Database management programs are used to manage databases. Examples of currently available database management programs include DB2™ (for larger databases) and dBase™ (for personal computers).

Typically, a database management system (DBMS) is used to manage the creation,.storage, access, updating, deletion, and use of a database. A typical DBMS creates databases and their structures; provides the means for the control and administration of the data in the database; provides the means for users and application programs to access, enter, modify, and manipulate the data in a database; provides a report generator; provides "ad hoc" query facilities; provides reports to management on who accessed the database and what activity was performed; provides reports to operators on hardware utilization, status of current users, and other monitoring data; and provides automatic backup and recovery routines for the data in databases.

Multiple-user databases present several additional challenges. These include maintaining system performance as the number of users increases, controlling concurrent access of data, maintaining security, and administrating the database.

Attempts to build and use customer databases have a variety of limitations. In a general sense, these limitations fall into two distinct categories: limitations in the sources and quality of data input into the database and limitations on one's ability to search and retrieve data from the database. In some cases these limitations work in opposition to one another. For example, as one improves the size and quality of a databases, searching and retrieving data from the database becomes more difficult.

Full service financial institutions typically offer consumers a wide variety of financial products, including traditional deposit, investment, loan, and mortgage accounts, as well as a variety of financial services, including credit cards, brokerage, direct access, business access, checks as cash, telephone bill payment, and safety check. In addition, financial institutions now typically offer access to financial services through a variety of means, including automatic teller machines (ATMs), customer activated terminals (CATs), screen phones, personal computers configured for banking, personal digital assistants, voice response systems, and smart cards, as well as traditional human bank tellers. Information from these diverse sources provides an opportunity to obtain an unusually complete picture of a customer's relationship with the financial institution. Thus, the ability to store and retrieve this wealth of data in a meaningful way has enormous commercial potential. Despite this commercial potential, there remains a need for a system and method for assembling a comprehensive database from these diverse sources and retrieving information from the central database in a meaningful and practical way.

There are several deficiencies in currently available systems and methods for assembling customer financial data and retrieving information for use in marketing and customer service systems. To begin with, conventional systems do not allow access to a customers' entire relationship with the financial institution or complete demographic information about the customer (i.e., the customer's "profile"). Basic information about existing customers is frequently not available or even recognized as being related to the customer.

Thus, there remains a need for an improved integrated global communications network and data model that integrates customer information and makes the information accessible from remote locations.

SUMMARY OF THE INVENTION

One object of the present invention is to provide an integration facility that can take business level request at a fairly high level, from a variety of vehicles and decompose them to smaller data level requests that are understandable by a variety of service providers. The integration facility bridges the gap by decomposing business language requests into data level commands.

Another object of the present invention is to provide a system and process that allows a bank to truly understand a customers's relationship with the bank. Since this involves real banking transactions, accounts cannot be linked based on inference, but rather there must be some authorization before the accounts are tied together.

Another object of the invention is to provide a data model that reflects the structure of a customer's relationship to the bank and the customer's profit and services they had tied in with the bank to allow the bank to tie together, for example: the fact that the customer and the customer's spouse jointly own certain things; the customer's spouse owns certain things in their name; the customer's children have certain things in trust with one or the other or both of the parents and the bank could tie the customer all together in various ways to give the customer the advantage for pricing the customer's account and give the customer advantages for any information from their point of view.

Another object of the present invention is to provide an integration facility that supports identical data bases located in different cites in real time so that transactions are posted physically in real time on two or more separate, geographically spaced apart, central databases.

It is a further object of the present invention to provide a system and method for standardizing and householding information from internal and external sources into a centralized database of a financial institution to allow the institution to better understand each customer's relationship with the institution.

It is a further object of the present invention to provide a system for efficiently assembling and retrieving information from a centralized database containing a high volume of financial and demographic data to allow the institution to better understand each customer's relationship with the institution.

These and other objects are achieved by the present invention which provides a global communications network that integrates customer information and makes the information accessible from remote locations. The system includes a comprehensive database assembled from diverse sources and means for retrieving the information from the central database in a meaningful and practical way. The system includes several levels of access communications as well as built-in flexibility so that it can be accessed by a variety of remote systems of varying degrees of complexity and languages.

The system of the present invention enables development of a closer relationship between customers and the bank by providing vast quantities of information to the consumer group and business group users. In more detail, the system of the present invention accesses both traditional customer demographic information, such as name, account number, and other identifiers in addition to other demographic information such as legal ownership, statement packaging, and liability and asset pricing. The demographic information is to be kept in repositories that support pending transactions as well as coordination of account information.

The ability to store "pending" transactions is particularly important. The "pending" ability enables a "corporate memory," such that the prospective or current customer of the bank may initiate a conversation at one touch point (e.g., on the phone), and then resume the conversation at the point it was interrupted, at any other touch point of the bank, at any point in time.

In the global deployment, the system of the present invention will be accessible to customers and bank employees through branch systems, ATMs (CATs), screen phones, Personal Computers or other devices while using only a single identifier such as a card or PIN. The system of the present invention will also make data available based on other customer's information, such as account number(s), name, and social security number. The system of the present invention will allow customers to be provided with easy "one-touch" type financial services while providing disparate businesses with an integrated customer services resource that provides greater demographic information about customers which, in turn, makes service delivery more efficient.

Technically, the system of the present invention is an enterprise wide operational customer information system built on a distributed UNIX Operating System platform using ORACLE to manage the databases. The system includes standardized messaging infrastructure for efficient processing of all transactions between different systems using high performance multi-tier parallel message routing. The system has the ability to manage both asynchronus and synchronous processing. The system can take one message, split it into multiple messages and send all resulting messages at once. Responses are then processed on all available information without necessarily waiting for all data/messages to respond.

The messaging service infrastructure includes a two-tier routing structure. Primary routing occurs within the delivery system interface to expedite simple transactions that can be sent directly to the core application or other servicing system. Message standardization coding is not usually required for these transactions. Complex transactions are intended to be sent through the system, whether or not they require a database lookup or not. The system workflow manager determines the appropriate system applications, depending on the message, and those applications create the necessary additional messages required for communication with multiple core applications or servicing systems to complete the transaction request. Message responses are then processed by the appropriate system application and the aggregated response is returned to the delivery system via the interface.

The core application and/or servicing system interfaces preferably "wrap" legacy systems by providing specialized message management for each system. This wrapping functionality theoretically minimizes any customization or enhancements to these older mainframe systems. Significant functionality can eventually be built into the system to effectively bypass individual legacy systems. Although, the system need only provide very limited additional functionality. The system infrastructure provides a platform within which multiple system management objectives can be optimized.

In accordance with another important aspect of the present invention, the integration facility preferably supports identical data bases located in different cites in real time. Thus, transactions are posted physically in real time on two or more separate, geographically spaced apart, central databases. The central databases are always kept in lockstep so that even if one central database is destroyed the system can continue to operate without interruption. A commercially available product such as Reliable Transaction Router™ ("RTR") from Digital Equipment Corporation™ can be used for this purpose. Of course, other systems could be used. ORACLE could be used as described hereinafter or some other dbms™ such as IBM™'s DB2™ could be used without altering any of the features of the present invention. Alternatively, it is possible to port from UNIX™ to IBM™'s MVS™'S operating system on another set of hardware.

Preferably, the system is 100% customer available, no matter what happens so that the bank can turn off one central database for maintenance and because another site replicates the central database, things keep on going unaffected.

The system also provides means that allow the distribution points and service providers to be configured to understand that there are multiple places where they could get information. Preferably, this means is in the form of software for controlling existing computers used at the distribution points and service providers. Home-based PCs used in the system, for example, have the capability of dialing to multiple telephone numbers that go different places. Cash machines are on a dual network and they select whatever circuit happens to be available. In the case of teller stations or work stations, the work-stations themselves go through a gateway server in each branch. So actually it is the gateway server that is capable of accessing the different databases.

The system permits simultaneous processing of transactions and includes a store forward mechanism so that if the data center is off line for maintenance, the system queus up the transactions and when the central database is back online, the system processes the transactions so that the central database catches back up very quickly.

In addition, the system allows the customer to interact with a financial institution that provides a variety of services through many different means including automatic teller machines, screen phones, voice phones, personal computers, branch tellers etc. without having to learn a new system. The system always provides a consistent business level consumer interface. The system preferably allows the customer to perform all transactions around the clock and around the world. In this way, a customer may choose whether to visit a bank in person, call the phone, or use a computer, the services available are all the same without altering the customer's experience. Every access point is just another window into the financial services accounts.

Because the system is fully integrated, it provides operating efficiencies and cost reduction. This, in turn permits the financial institution to pass cost savings along to the customer which, in turn, strengthens customer loyalty and promotes relationship building. In effect, the present invention promotes a cycle of increased efficiency and cost savings that benefits both the financial institution and the customer and tends to bind the customer to the financial institution more closely in a way that benefits both the customer and the financial institution. From the financial institutions point of view, the system, by offering the customer advantages, promotes customer loyalty and relationship building.

In the preferred embodiment, the central databases store, in two (or more) separate locations, information from various businesses and markets within the financial institution. The central database may include information concerning existing customer financial information, information from outside sources, and demographic information about existing and potential customers. In the preferred embodiment, the central database is housed in a mainframe computer and includes a large repository of financial and demographic data. Information is fed into the database from a variety of sources, including business and credit card feeds from the financial institution for each product and service offered by the institution, and feeds from outside vendors. The outside vendor feeds preferably include all publicly available demographic information, phone numbers, addresses, tax and property records, and so forth.

The data from these sources is stored in a uniform format. For this purpose, a uniform storage or householding algorithm, a name and address standardization process, and a merge process may be used. In addition, the information is preferably maintained in the central database in a three-tier hierarchy so that it can be accessed selectively at household, customer, and account levels. A given household may have one or more customers, and each customer in a household may have a number of different accounts.

Thus, the central database serves as a single central repository for storing all customer related information throughout the business. As described hereinafter, the central database can be used for a wide variety of customer service, financial analysis and marketing purposes. Among other things, the system includes several integrated components that are used to view customer information and manage customer contacts and relationships. Relationship management components support a comprehensive sales process. The system provides a relationship profile that allows appropriate staff members to view household and customer account and balance information both in detail and summary form.

While a single central repository for storing all customer related information throughout a business offers significant potential, the database is necessarily so large that certain problems arise. For example, the present inventors recognize that a database of this size cannot practically be directly searched. Thus, in accordance with another aspect of the present invention, the system of the present invention includes means for allowing users to build programs for searching the central database.

The relationship profile component of the customer information system of the present invention allows appropriate staff members to find and view household, customer, and account level information. The relationship profile component shows current and historical financial and behavioral information about the total relationship of the household or customer with the financial institution. It contains information on individual accounts owned, how customers do their banking at the financial institution, and whether they are managed by a particular personal banker. The relationship profile component provides a sales preparation tool that displays all the information available about the customer, the customer's relationships to other customers, and in-depth account information on all accounts owned by the customer and/or the entire household.

Information is available in the relationship profile component in detail as well as in summary forms. In combination, the information in the relationship profile can be used to gauge the depth of each banking relationship in order to better prepare for sales and service conversations.

The present invention comprises a network structured service architecture that rapidly relays information from one end user to another located anywhere on the world wide network. The end users are located at distribution points which relay information to and receive information from the network. Information requests are relayed from a distribution point to a logical router which determines whether the request is simple or complex.

Upon the determination of a simple request, the request is routed by the network to the appropriate service provider that can satisfy the distribution point's request. Information relating to the satisfaction of the request is then routed back through the network to the originating distribution point.

Upon the determination of a complex request, the request is routed to messaging service agents, which consult script and workflow data model rules, send one or more messages to logical services which determine which service provider is appropriate to receive the complex request. The complex request is then routed to the appropriate service provider which performs the request. Information relating to the satisfaction of the request is then exchanged between the distribution point and the service provider until the request is satisfied.

A system journal is maintained of all requests, simple and complex, the network routes between distribution points and service providers for the purpose of satisfying audit, legal, regulatory, customer service requests, and the like.

Finally, the network communicates with a replication data center. A data replication center includes an electronic storehouse for storing data necessary to perform the simple and complex requests. In addition, the center includes a duplicate storehouse to ensure that the network is always provided with the data stored in the storehouses, especially in the event of an electronic failure to a storehouse or the supporting and accessing electronics.

Thus, the present invention provides a global communications network for use by a financial institution. The global communications network includes a plurality of local area networks; a plurality of distribution points for allowing access to the global communications network; a plurality of service providers for providing information in response to data level commands; and an integration facility for decomposing high level business language requests into data level commands that are understandable by the service providers so as to allow end users located at distribution points to relay information to and receive information from the network.

The integration facility includes:means for determining whether an information request is simple or complex; means for receiving information requests from a distribution point and relaying the information requests received from a distribution point to the logical router for determination of whether the request is simple or complex; a router for routing simple requests to a service provider that can satisfy the distribution point's request; means for generating a message relating to the satisfaction of the request; a router for routing messages relating to the satisfaction of the request back through the network to the originating distribution point; a plurality of messaging service agents, each messaging service agent including means for consulting script and workflow data model rules, and sending messages to logical servers which determine which service provider is appropriate to receive the complex request; means for routing complex requests to messaging service agents, which consult script and workflow data model rules, send one or more messages to logical servers which determine which service provider is appropriate to receive the complex request; a router for routing complex requests to the appropriate service provider which performs the request; means for allowing information relating to the satisfaction of the request to be exchanged between the distribution point and the service provider until the request is satisfied; means for generating a message relating to the satisfaction of the request; a router for routing messages relating to the satisfaction of the request back through the network to the originating distribution point.

The global communications network of the present invention may further include means for maintaining a system journal of all requests, simple and complex, that the network routes between distribution points and service providers.

The global communications network of the present invention may also include a replication data center in communication with the network. The data replication center preferably includes: a plurality a geographically separate electronic databases for storing data necessary to perform the simple and complex requests; means for posting transactions in real-time on each of the plurality of the geographically separate electronic databases so that the electronic databases are always kept in lockstep.

The global communications network of the present invention may further include a public network having a firewall that includes means for limiting access to the public network to authorized users. The network of the present invention preferably allows a customer to directly connect to the public network through the firewall using a computer modem and also includes a remote delivery server for providing access to the integration facility of the global communications network's banking products and services and means for allowing a customer to directly connect to a remote delivery server using a computer modem, wherein the customer is provided with a messaging scheme that is identical to the messaging scheme the customer would receive from an in-branch connection with the integration facility of the global communications network.

The global communications network of the present invention may further include a plurality of financial institution branch systems and a branch server and a branch router for routing messages to and from integration facility of the global communications network such that the integration facility of the global communications network is in electrical communication with the financial institution branch systems. The branch systems may further include a branch network and a plurality of branch services connected to the branch network the services, including a printer, an automated teller, a customer activated services terminal, a staff workstation and a terminal server, express deposit devices, teller work stations, greeter workstations and investment consultant work stations. Preferably all branch services share a common local area network and are located within a branch of the financial services provider such that each of the services enjoys access to the same computer financial applications; related computer applications; and common routes and servers to the integration facility of the global communications network.

The present invention also provides a process for decomposing high level business language requests into data level commands that are understandable by the service providers so as to allow end users located at distribution points to relay information to and receive information from the network. The process includes the steps of: receiving information requests from a distribution point and relaying information the requests received from a distribution point to the logical router for determination of whether the request is simple or complex; routing simple requests to a service provider that can satisfy the distribution point's request; generating a message relating to the satisfaction of the request; routing messages relating to the satisfaction of the request back through the network to the originating distribution point; decomposing complex requests into one or more messages; determining which service provider is appropriate to receive the complex request; routing complex requests to the appropriate service provider which performs the request;exchanging information relating to the satisfaction of the request between the distribution point and the service provider until the request is satisfied;generating a message relating to the satisfaction of the request; routing messages relating to the satisfaction of the request back through the network to the originating distribution point. The process may also include the step of posting transactions in real time on each of the plurality of the geographically separate electronic databases so that the electronic databases are always kept in lockstep.

The above mentioned and other features and objects of the invention, and the manner of attaining them will be best understood by reference to the following description of an embodiment of the invention, when considered in conjunction with the accompanying drawings:

DESCRIPTION OF THE PREFERRED EMBODIMENT

Figure 1:
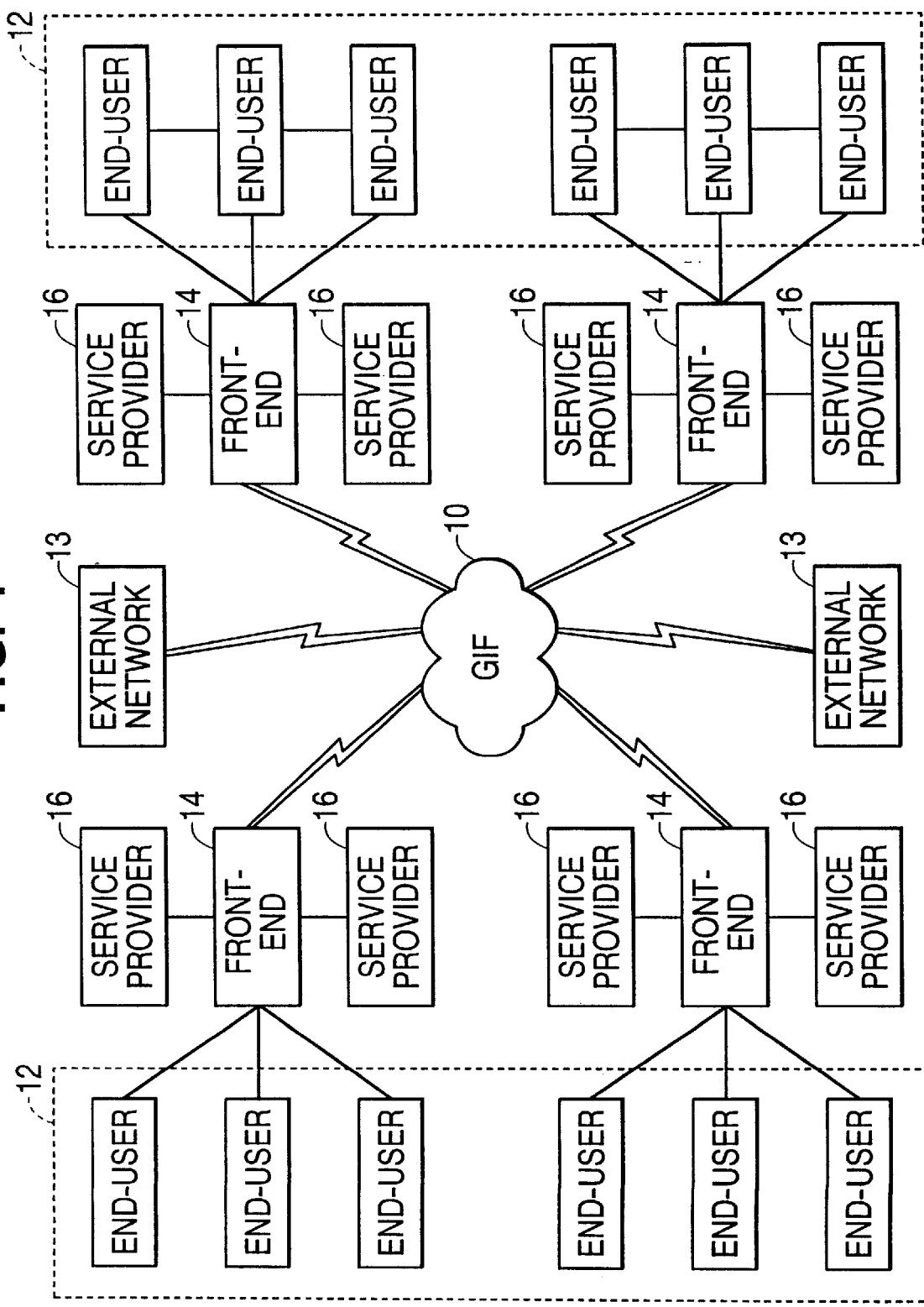
FIG. 1 depicts an overview block diagram of components of a Global Intergration Facility (GIF) according to the present invention and communication links between international information service providers and the GIF.

The basic architecture of the present invention is set out in FIG. 1. The present invention comprises a Global Integration Facility 10 (GIF) that allows for the direct interface of a plurality of international users. The international users communicate via a front end service provider thereby allowing customers, financial institutions, and the like to interface with customer financial information. Such information may include customer demographics, money accounts, stock portfolios and other negotiable instruments, credit ratings and so forth. The interface with the information allows both customer and financial institution to facilitate financial lending requests, monetary transactions and account manipulations from any worldwide location of a user. Furthermore, the GIF allows for modern telecommunications links between all users of the network, allowing for example teleconferencing and videoconferencing.

As depicted in FIG. 1, the GIF 10 provides the central communications network between networks of worldwide end users such as customer activated terminals (CAT) 12.

The CATS in the CAT network 12, like the common ATM machine, provide a direct link between an end-user or customer and a computer network. The GIF 10 is also in communication with one or more financial institutions and financial service providers. CAT's and ATM's are located world wide and have supporting computer networks in place. A CAT is a computer terminal that allows the user to access his or her financial and demographic information and manipulate same. Therefore, a CAT can make it possible for an end-user to initiate and complete any financial transaction including buying and selling of stocks and other financial instruments, obtaining loans, and transferring and debiting accounts. CATS generally operate on proprietary and shared ATM and banking networks. The CAT networks 12 interface with the GIF 10 via front end communicators 14. These communicators may include any electronic telecommunications means known to one skilled in the art that provides for two way data transfer. In addition to communication with CAT's and their equivalents, front end communicators 14 may facilitate communications between the GIF and financial service providers located outside the CAT computer network, as depicted by direct connections of box 16. In addition, the GIF provides access to other external networks 13.

Figure 2:
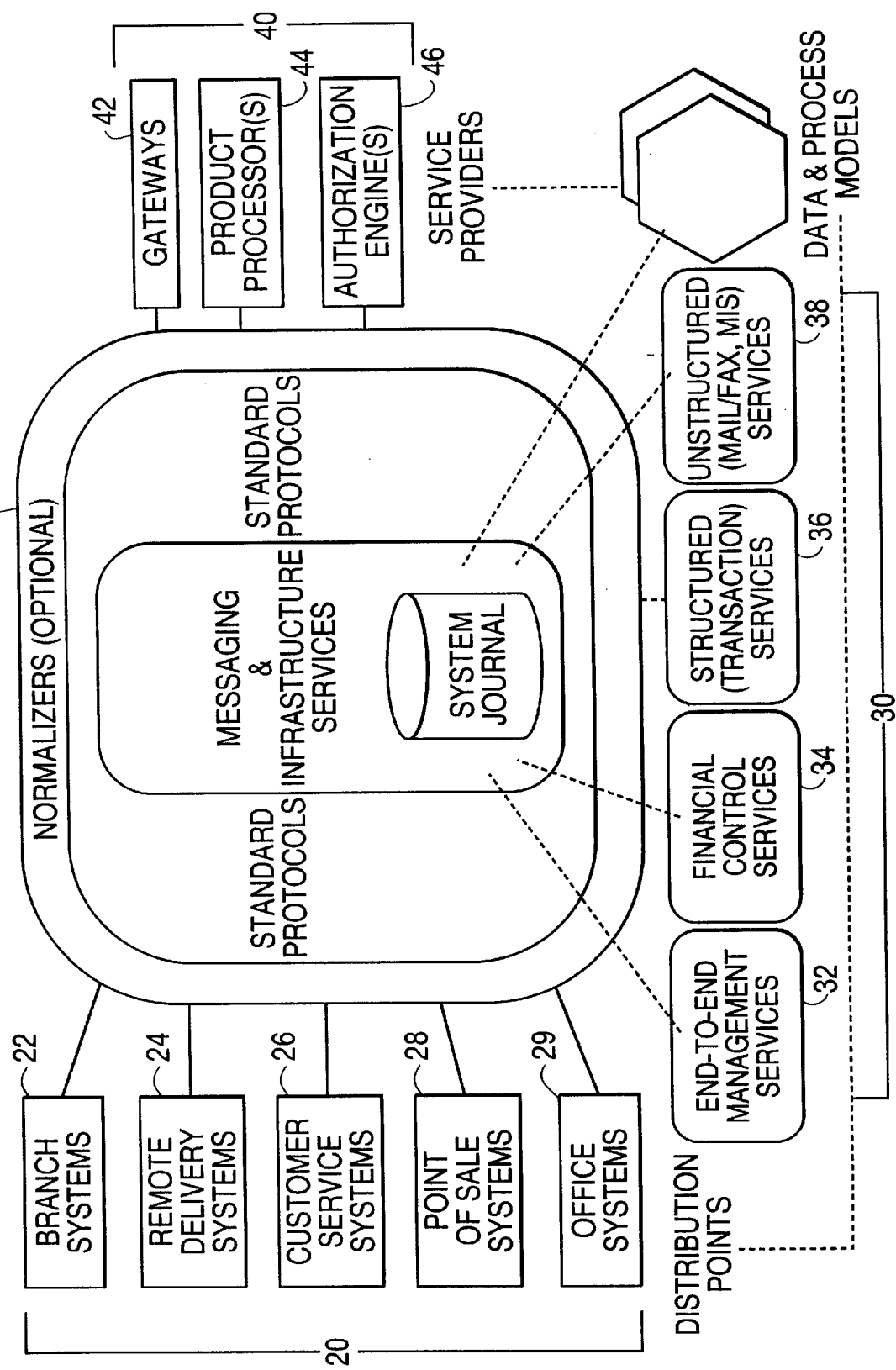
FIG. 2 depicts a block diagram of the GIF shown in FIG. 1 including communication links between the GIF and particular types of external users.

FIG. 2 depicts the GIF 10 in relation to the particular services provided to an end user. Column 20 (which generally corresponds to item 12 in FIG. 1) depicts the interface or distribution points of the end user and the GIF, wherein the end user can 'touch the GIF'. The distribution points provide the end user with the capacity to perform: structured requests (for example, monetary transactions); unstructured requests (such as, e-mail, fax, voice, video, etc.); overview from management (hidden from the 'view' of the end user, however continually monitoring the transaction request); and a sense of financial control. Many distribution points are equipped with at least one workstation that is designed to run Microsoft's Windows NT® or Windows 3.1® operating systems or equivalents, while others are less sophisticated. Less sophisticated distribution points may include household telephones. The distribution points are depicted as boxes having communication 'links' (connecting lines) to the GIF 10. The boxes 20 as depicted indicate branch systems 22, remote delivery systems 24, customer service systems 26, and point of sale systems 28, and office systems 29.

In addition to end user controlled financial transactions, the GIF provides access for the end user to financial transactions related services. These services generally correspond to item 14 in FIG. 1 and are set out in FIG. 2 row of boxes 30 having communication 'links' with the GIF 10. The services depicted include end-to-end management services 32, financial control services 34, structured services 36 and unstructured services 38.

In addition to controlled financial transactions and related services, GIF provides access to the end user to service providers, which generally correspond to item 16 in FIG. 1 and as indicated by column 40 and the interrelationship between the boxes of this column and the GIF 10. Each service provider may participate in one or more of the following services: structured; unstructured; management; and financial control. Standard protocols are used for requests and responses between service providers and end users including: voice, video, e-mail, fax, and so forth. Service providers include: gateways 42; product processors 44; and authorization engines 46.

Figure 3:
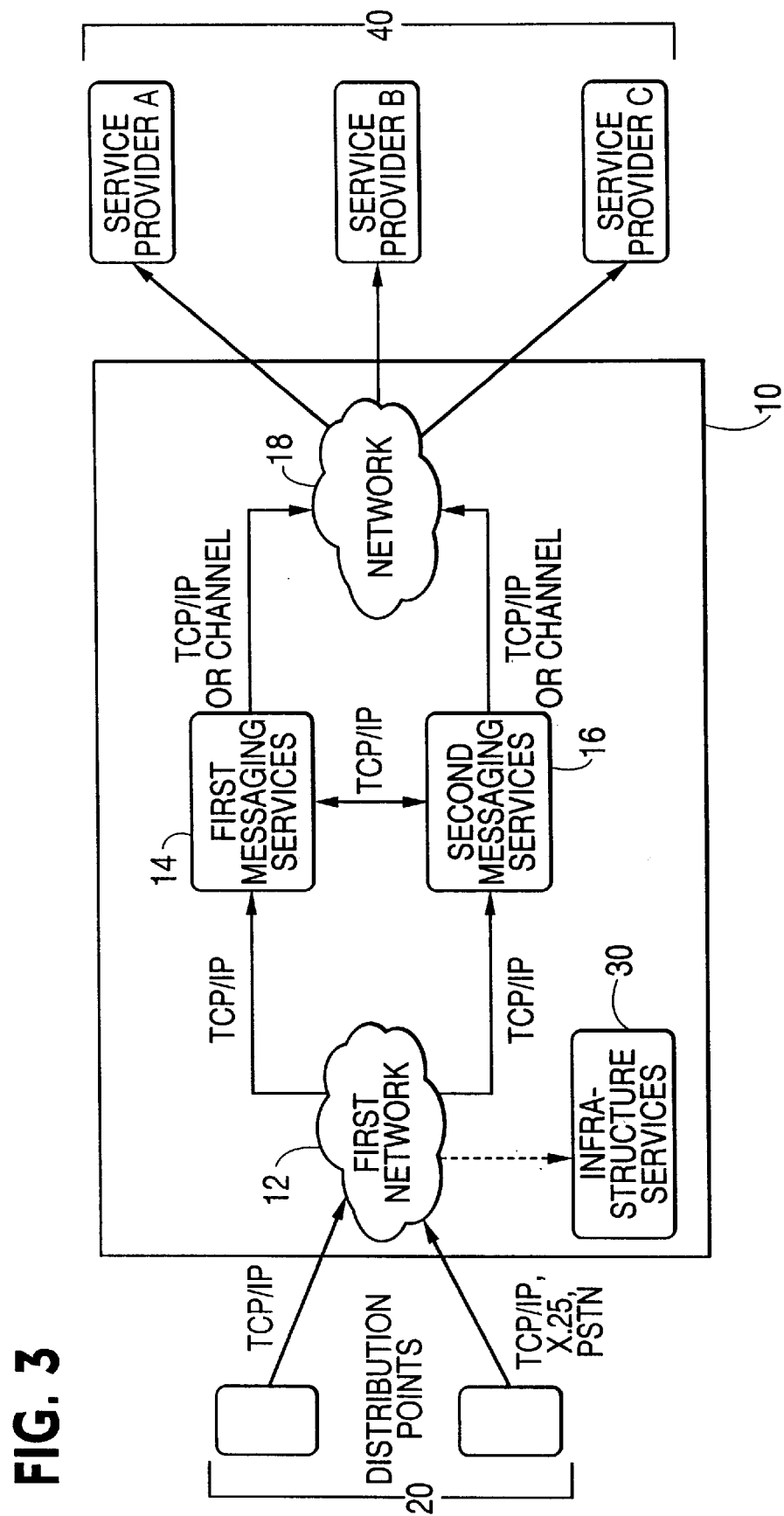
FIG. 3 depicts a block diagram of the general topology of the GIF shown in FIG. 1.

FIG. 3 depicts the general topology of the GIF 10. The GIF provides a comprehensive set of services for the control and routing of structured and unstructured messages and requests between distribution points and service providers. The GIF also provides centralized supervision for the requests as well as access to services for fault tolerance. In addition, the GIF supports communications protocols including, X.25, Transmission Control Protocol/Internet Protocol ("TCP/IP") and Synchronous Data link Control ("SDLC"). As depicted, the general topology includes distribution points 20 in electronic communication with the GIF 10 and service providers 40. The infrastructure of the GIF 10 includes a first network 12, in electronic communications with infrastructure services 30 as well as a first messaging service 14, a second messaging service 16 and a second network 18. Furthermore, the GIF supports synchronous and asynchronous messaging wherein the former provides for return messaging while the latter disregards the return messaging and commences directly into processing of messages. In addition, the GIF supports the capacity to pause or break single messages down into several component messages and process the individual pieces thereof.

The first and second networks route electronic messages to and from external end users, via logical routers, according to a determination of which type of message (structured, unstructured, etc.) is being routed. The messaging services contain application logic that supervise the transactions requested based upon script, workflow, and data model rules. In operation, the messaging services handle structured requests from distribution points by decomposing, processing, recomposing and reversing the messages according to a set of business rules and processing scripts. The messages are then routed to the appropriate service provider as based on routing criteria developed from data partitioning, load balancing, site availability and the like. An incoming request message may cause multiple messages to be dispatched to a secondary router for delivery to a service provider. Messaging services messages may be synchronous or asynchronous and may be response messages triggering the dispatch of still more messages. In addition, the messaging services will usually work in request/response messaging pairs, however, one-way messages may be issued from distribution points indicating, for example, an emergency shutdown. Furthermore, the message services may be used to issue broadcast messages to all distribution points, including hot card list updates, interest rate changes and scam messages. Finally, but not limiting, the messaging services may be used to keep logs of message sent thereby, including the nature and directions thereof.

Figure 4:
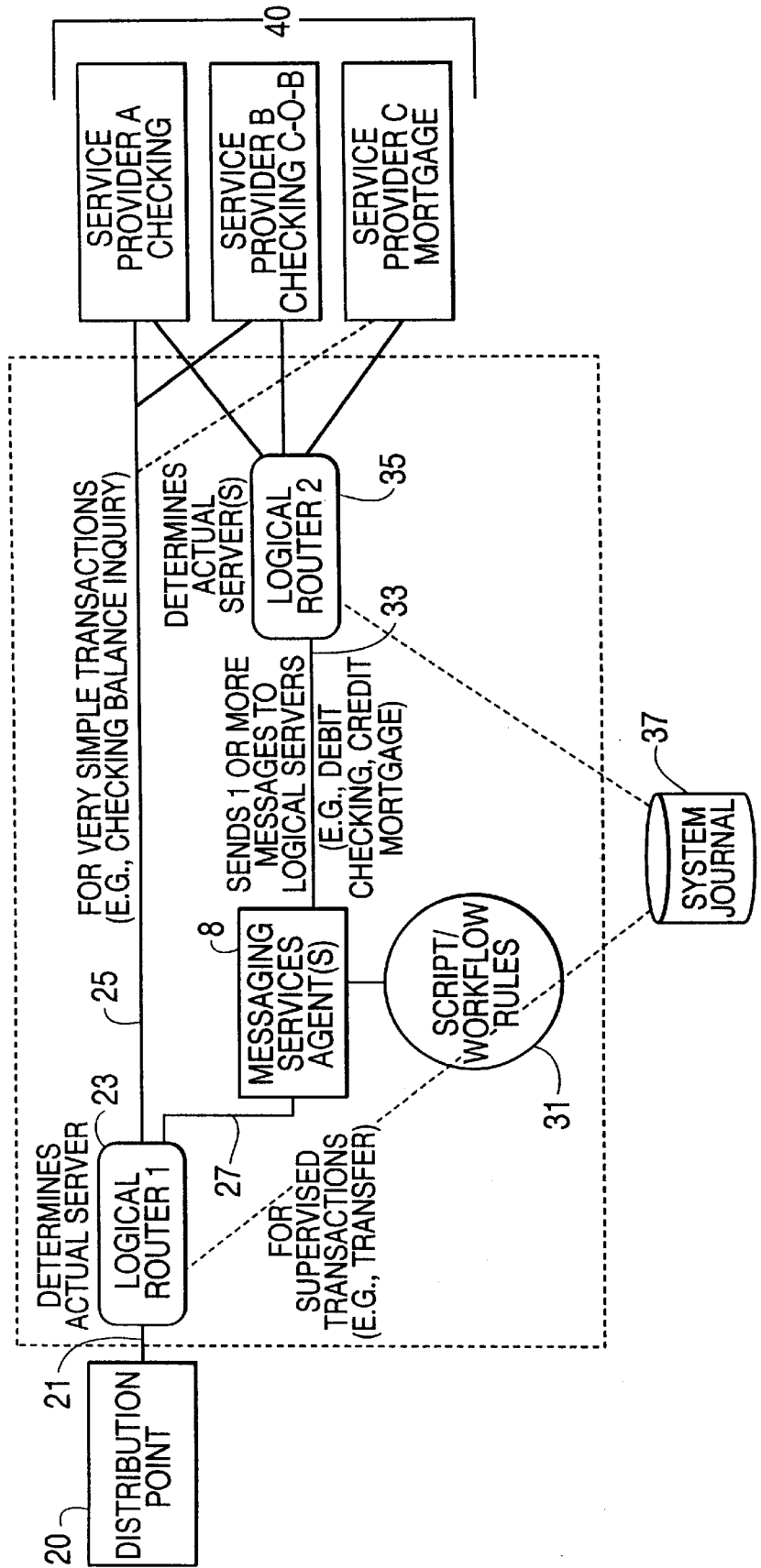
FIG. 4 depicts a block diagram of the topology of the GIF with regard to structured services architecture with the portion in the dashed box corresponding to the "messaging and infrastructure services" of FIG. 2.

FIG. 4 depicts the architecture of structured messaging. As shown, distribution point 20 electronically communicates via connection 21 to a first logical router 23. Logical router 23 then determines whether the message is simple or complex (i.e. requiring supervision). If the message is determined to be simple (not needing supervision) the message is routed along line 25 to the appropriate service provider depicted in column 40. Service providers include checking services, checking c.o.b. services, and mortgage services. Additional services provided are limited only by the state of the financial services art. If the message is found to be complex (requiring supervision), the message is directed along line 27 to a messaging services agent(s) 8. The messaging services agent 8 processes the message using, among other criteria, the script/workflow data model rules 31, then directs the complex message along line 33 to second logical router 35. Second logical router 35 then directs the complex message to the appropriate service provider depicted in column 40. A log or journal of the simple/complex structured message routing is kept by system journal 37.

Figure 5:
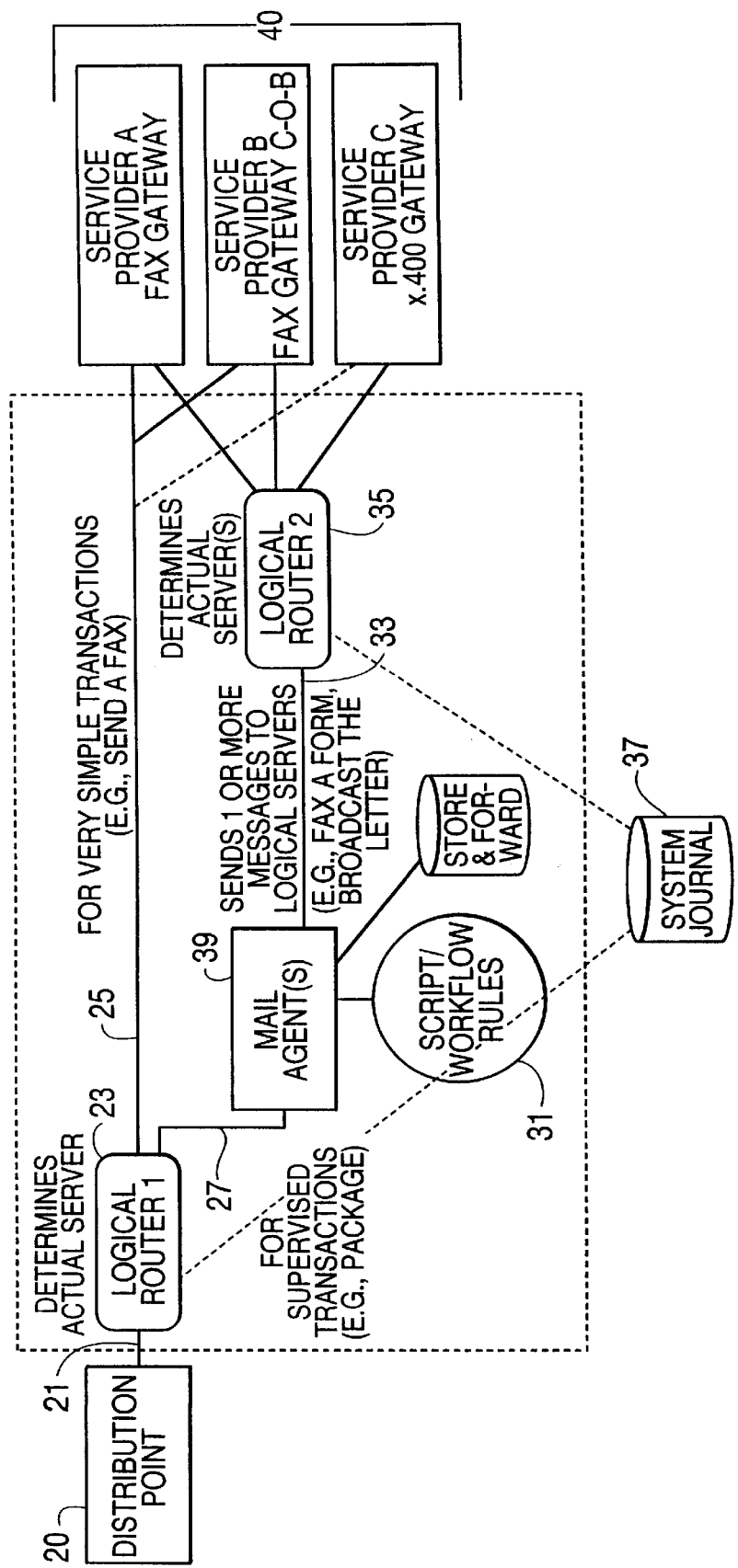
FIG. 5 depicts a block diagram depicts a block diagram of the topology of the GIF with regard to unstructured services architecture.

FIG. 5 depicts the architecture of unstructured messaging. As shown, distribution points 20 electronically communicate via connection 21 to a first logical router 23. As detailed above, a determination of the complexity of the message sent is made. Simple messages are directed along line 25 to the appropriate service provider. Complex messages are directed along line 27 to mail agent 39. Mail agent 39, using script/workflow rules 31 (among other criteria) sends the message to second logical server 35, along line 33, to be delivered to the appropriate service provider.

With both structured and unstructured architectures, the logical routers also perform messaging services replication by communication with at least two dual data centers. A data center maintains a data storage of all customer information as well as messaging logs, contents, criteria etc. and all other data necessary to operate the GIF. The data centers maintain dual data storage devices to maintain the GIF in the event of a crash by one of the data storage devices. An example of a data storage center is depicted in FIG. 6.

Figure 6:
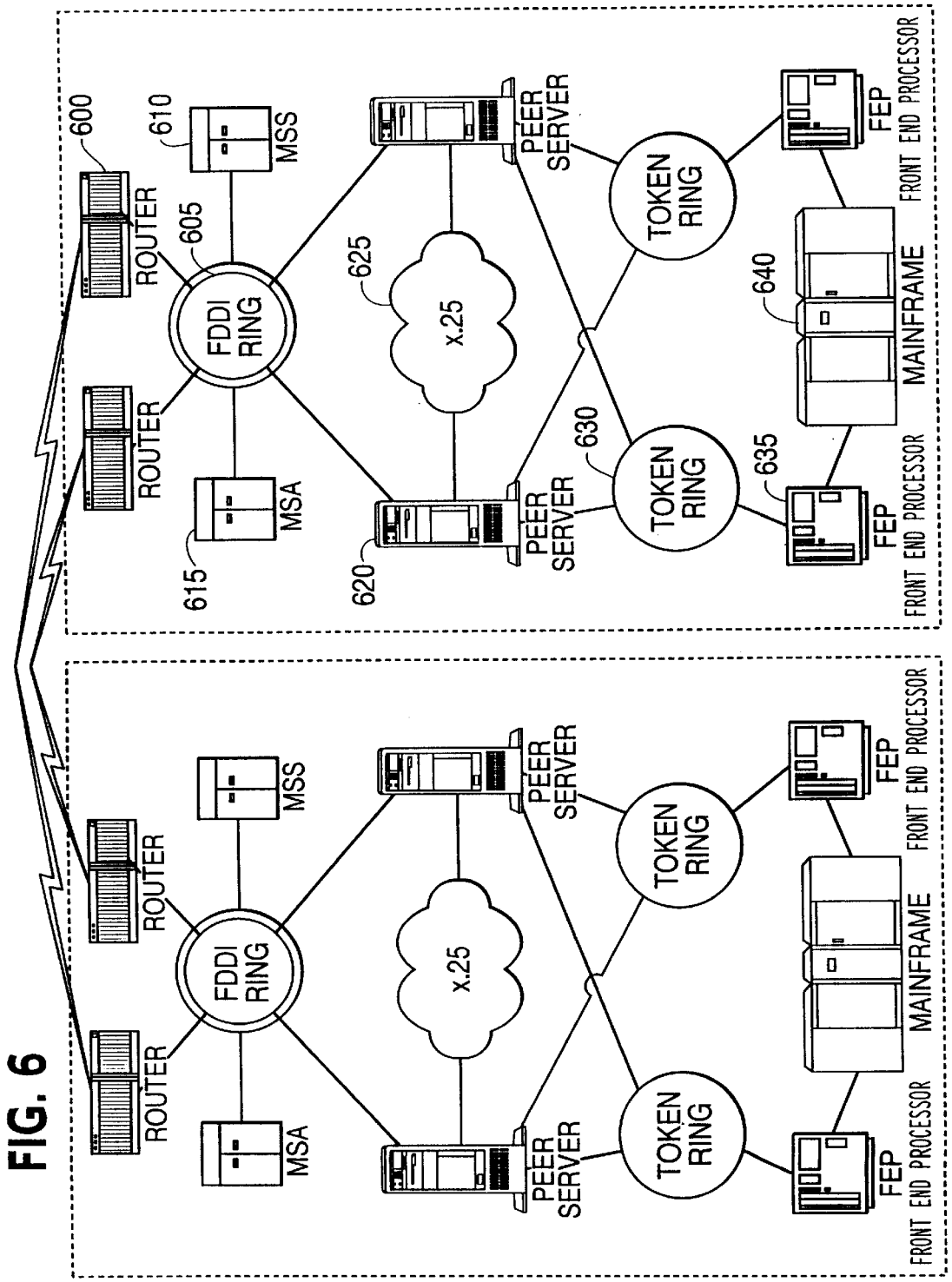
FIG. 6 depicts a replication site.

FIG. 6 describes a multiple in-depth redundant system composed, at the lowest level of redundancy, of two mirrored facilities linked by routers 600 connected to (fiber distributed data interface (FDDI) backbones 605. The FDDI form of local area network is currently preferred,.but other forms of local area networks such as Ethernet, FastEthernet or ATM could be used. Within each facility, the system is composed of mirrored systems connected principally by an FDDI backbone 605 and token ring networks 630. Each system is composed of a Peer Server 620 and front end processor 635, such as an IBM 3174™ or 37XX™ computer, tied to a mainframe computer 640. In the illustrated embodiment, the mirrored Peer Servers communicate with each other through a token ring network. The peer servers receive wide-area non-TCP/IP request inputs via an X.25 packet switched connection 625. The system is not limited to token ring network configurations. To the contrary, other network configurations, such as ethernet, can be used. The MSS 610 and MSA 615 systems are tied to this mirrored system arrangement via the FDDI backbone. The network allows any front end processor to communicate with multiple peer servers for redundancy/reliability. Also, while MSS and MSA are used on DIGITAL ALPHA under DIGITAL UNIX™, other systems such as those supporting ORACLE, RTR or OASIS IST4™ could be used. For example, IBM's DB2™ could be used without altering any of the features of the present invention. Alternatively, it is possible to port from UNIX™ to IBM's MVS™ operating system on another set of hardware.

Figure 7:
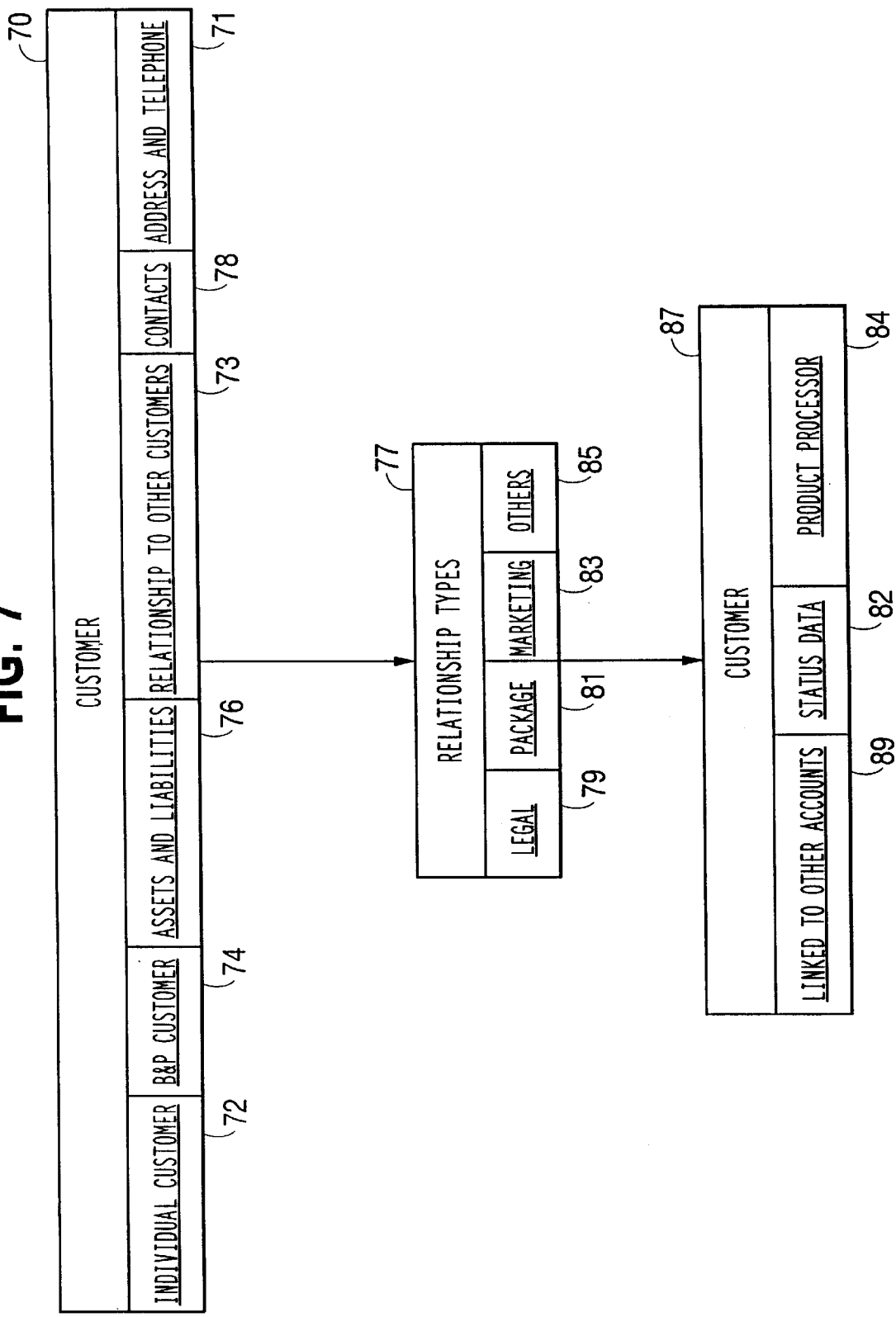
FIG. 7 depicts a block diagram of customer demographics as they relate to information essential in determining a customer's financial health.

As depicted in FIG. 7, customer demographics relates to the information essential in determining a customer's financial health and subsequent relative needs to and from a serving financial institution or service providers.

The customer relationship with different groups is based on a logical data modeling process that primarily segments business data into meaningful subsets, identifies the major entities, determines the relationships between entities, and provides attribute definition and data type identification.

The first level 70 in this relationship is the customer, which may contain many different attributes toward the overall relationship. The customer may be an individual customer or employee 72, with specific data about the individual, and business/professional customers 74, allowing for additional relationships to form for business services. Customer assets and liabilities 76, contacts for marketing 78, addresses and phone numbers 71, and customer to customer links are also provided. Finally there exists the relationship between the customer and other customers 73. The customer is identified by a customer identification number (CIN) and the CIN code supplies the needed information to determine the relationship type.

There are four major groupings 77 for relationship types, including legal 79, package 81, marketing 83, and others 85. The legal relationship attempts to determine the matrix between ownership, access, and liability. Banking packages form a relationship between the customer, the bank, the bank package, and the participating units in the relationship. The marketing relationship allows for customer leads and notes to be incorporated with the marketing campaign. The system is designed to permit the addition of other relationships based upon other criteria in the future.

The account tier 87 contains information about the customer's links to other accounts 89, the customer's status data 82, and product processor 84. Information on the customer links contains types of links and instructions, and types of uses for the account such as the role in account, the relationship, and banking package.

It is the intent of the distribution points in general to speak with the customer in a single language. The language is to interact with any end-user in any part of the world and to make using a distribution point easy and familiar. Because the distribution points include both audio and visual interaction with the customer, the single language includes general familiar terms in both communication modes.

The audio language and written word on a monitor or the like takes advantage of certain universal (action) verbs and nouns specific to financial transactions. Such terms include computer jargon and commonly used financial transaction terms. These terms include (but are not limited to) transfer, open and close,.balance inquiry, deposit, withdrawal, etc. To facilitate ease and familiarity between a distribution point and a non-English speaking end-user, translation software is implemented at the distribution point. The translation software translates all functions communicated to the end-user into the end-user's preferred language. The software is applied to both written functions as displayed on a computer monitor and spoken language as communicated through audio means.

In addition to language, the distribution points greet end-users with a common touch and feel look and format including world wide identical logos and screen formats. By using the same logos and formats the consumer becomes familiar with accessing and using the GIF via any available distribution point. Consumer familiarity breeds comfort with the system and allays fears of using the system in a remote location. This feature becomes especially effective when the consumer is traveling to a foreign destination and decides to take advantage of the GIF's global reach to access his/her hometown bank account to retrieve funds or engage in other financial transactions. In addition, because the distribution point accesses the GIF, the distribution point can call upon any available translation software on the GIF. The combination of the familiar touch and feel and native language allows the customer to perform financial transactions in the most comfortable manner possible.

Finally, the distribution points offer end-users the option of technical support in the form of branch personnel, service representatives and other available persons. Should the customer take advantage of a foreign distribution point, the GIF offers real time audio and video communications with an assisting representative located anywhere on the GIF. Therefore, a customer traveling to a foreign location can access the local distribution point in his/her own language, through a familiar touch and feel format and communicate via the GIF to a service representative of his/her choice at any on-line financial institution.

Figure 8:
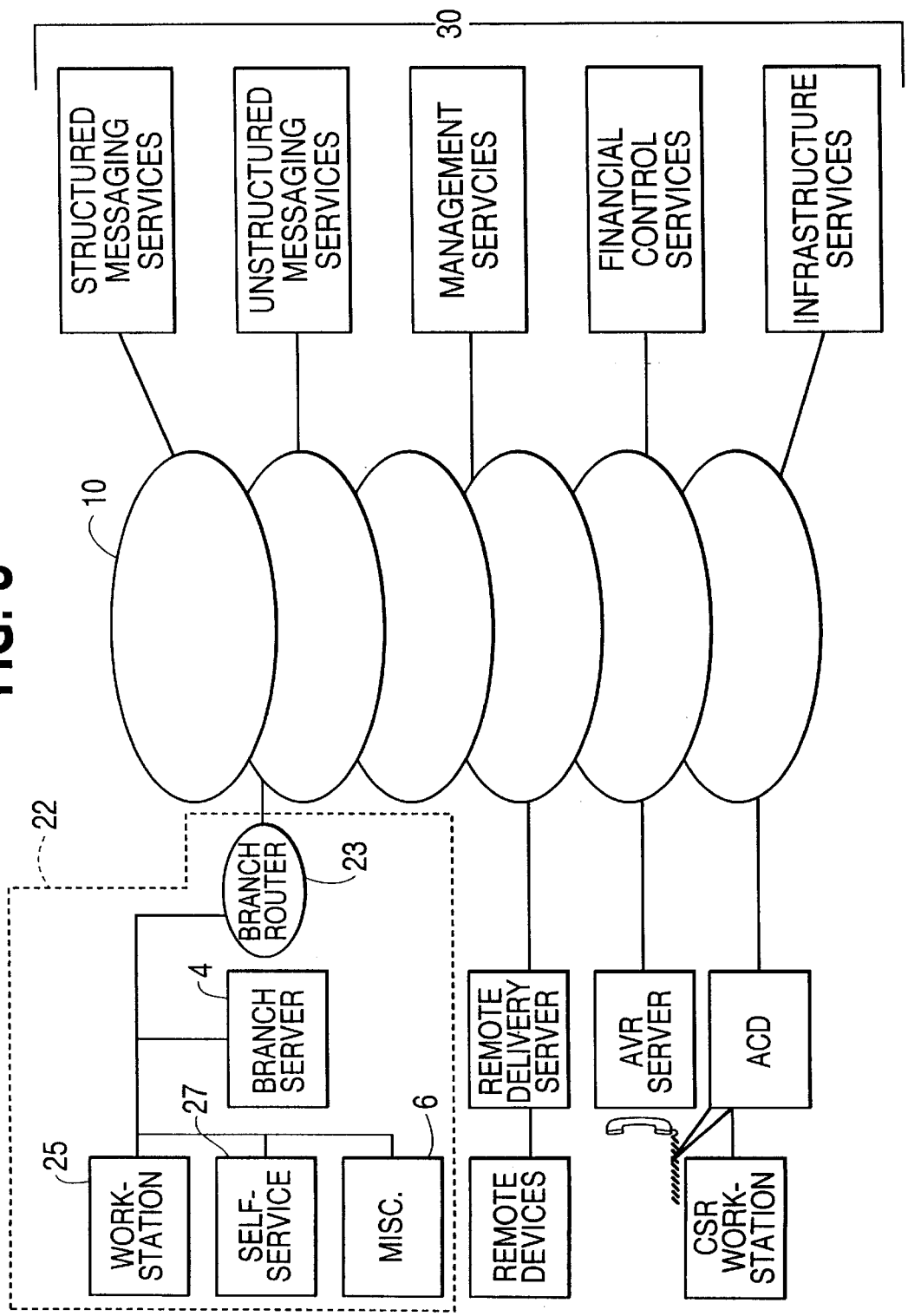
FIG. 8 depicts general topology of the interaction of the various distribution points and the GIF.

The general topology of the interaction of the various distribution points and the GIF is set out in FIG. 8. As depicted, the GIF 10 is in electrical communication with service providers 30. The GIF 10 is also in electrical communication with financial institution branch systems 22. With the aid of a branch server 4 and branch router 23, the branch systems 22 direct, messages to and from GIF 10. The branch server and router include any server and router known to one skilled in the art for facilitating two way electronic real time communication between any two operating systems. As shown in FIG. 8, the branch systems 22 further comprises the following general services: an in-branch workstation 25; an in-branch self-service station 27, and miscellaneous in-branch input devices as represented by block 6.

Figure 9:
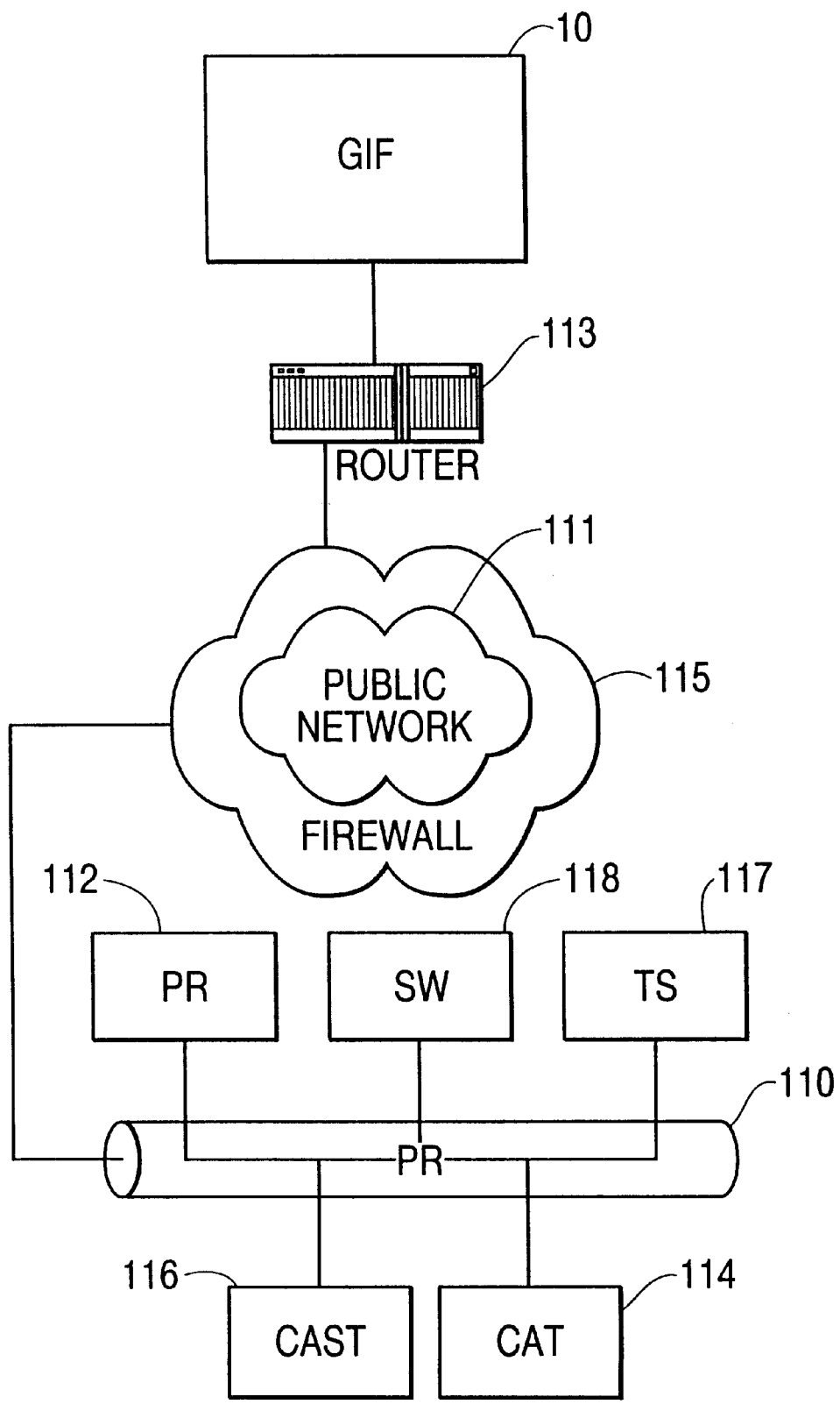
FIG. 9 depicts branch system architecture.

A more detailed depiction of the branch system architecture is shown in FIG. 9. As shown, the branch services consist of a plurality of specific and non-limiting in-branch services connected to a single network 110. These specific services include, printing 112, CAT 114, customer activated services terminal 116, staff workstation 118, and a terminal server 117. Other additional specific services that may be offered including express deposit devices, teller work stations, greeter workstations and investment consultant work stations. All of these services fall within at least one of the general service categories depicted in FIG. 8. The common thread among all these in-branch services is that they share a common local area network (LAN) and are located within a branch of a bank or other financial services provider. By incorporating all of the in-branch services into one LAN, each of the specific services enjoys: access to the same computer financial applications; related computer applications; and common routes and servers to the GIF. In this way, each computer terminal can communicate with the GIF at the relative same speed and enjoy the same access to information and service available from the GIF. The in-branch LAN depicted in FIG. 9 is electronically connected to a public network 111 which in turn is connected via router 113 to the GIF. The public network offers one route available to the in-branch LAN to communicate with the GIF. An alternative includes a private network with its own router. Because the public network is accessed by the general public, a firewall 115 protects communications through the public network from unauthorized interference.

A second type of distribution point includes a remote delivery server. The remote delivery server provides access to the GIF's banking products and services for the customer from a location of the customer's choosing. For this distribution point, the customer actually owns and operates the equipment used to communicate with the GIF and provide services therefrom. The customer equipment may include any computer system having modem capabilities and hardware capacity to effectively operate communications software provided by the financial institution. The communications software provided includes all necessary operating systems and the like to conform the customer equipment to the GIF protocol, format and language. The communications software enables the customer to access the GIF and provide the customer with the identical messaging scheme as the customer would receive from an in-branch connection with the GIF. The customer would also be afforded the equivalent presentation schemes as that found in CAT's and AVR's.

In addition to providing direct access from direct access communications, the customer equipment can also access the GIF through third party communications-enabled financial software. An example of third party communications-enabled financial software includes QUICKEN offered by INTUIT CORPORATION. Through self access and manipulation of the communications software, the customer can tailor the communication format platform to his/her own choosing.

Figure 10:
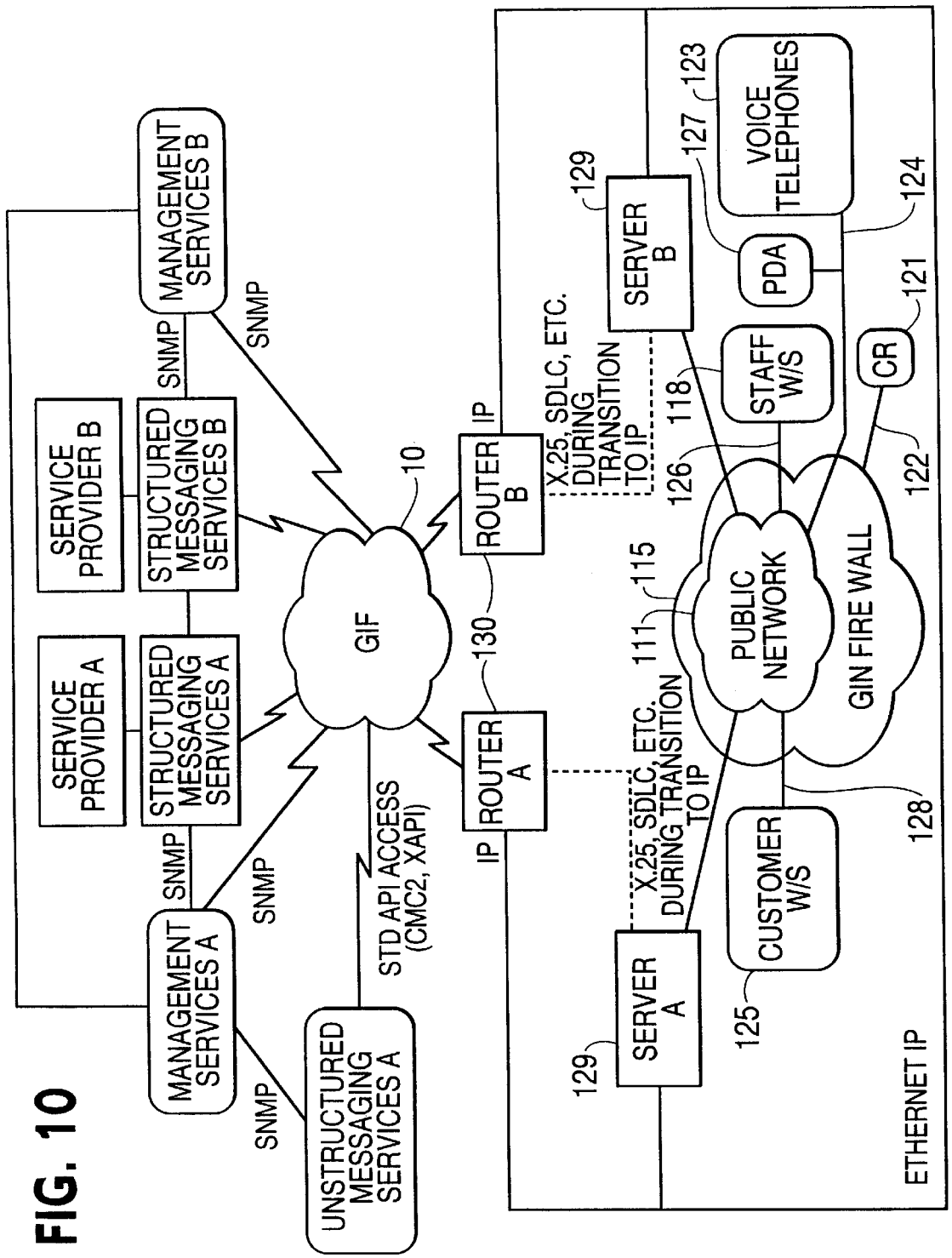
FIG. 10 depicts remote delivery server topology for a customer service system configuration and communication links between the configuration and the GIF.

FIG. 10 depicts an overview of the remote delivery server general topology. The customer using his/her own equipment can directly connect to the public network using X.25, SDLC or TCP/IP their equivalent during communication access. The customer equipment is represented by box 121 with direct connection, depicted by line 122, to firewall 115 and public network 111. In addition to computer modem communications, a customer can communicate with the public network 111 over a voice telephone 123, digital phone (not shown), video phone (not shown) and the like over a direct connection depicted by line 124. In addition, line 124 offers access to the public network 111 to personal digital assistants 127 such as THE NEWTON by APPLE CORPORATION. Authorized access to the public network entitles customers to access in-branch LAN's connected with the public network as discussed with regard to FIG. 8. Therefore, in addition to customer service available on the GIF, the accessing customer has access to local network in-branch customer assistance. In-branch customer assistance is depicted by staff work station 118 connected to public network via direct line 126. Other access to the public network is available from in-branch customer work stations depicted by box 125 with direct public network connection depicted in line 128. As further depicted by FIG. 10, the public network accesses the GIF 10 via servers 129 and routers 130. Furthermore, a first server may include a data center, as depicted in FIG. 6, for storage and logging of important messaging information communicating therethrough.

Customer support is available to the customer before, during and after the customer accesses the GIF. The scope of the customer service is limited only by the service available at a financial institution. Through the communications arrangement of the GIF, a live customer service representative is always available to the customer regardless of where in the world the customer access's the network. The general topology of the customer service provided by the present invention is set out in FIG. 10. The public network 111 includes voice recognition utilities (VRU) and automatic call director (ACD). The VRU includes any utility known to one skilled in the art for facilitating voice recognition electronic communication between a remote user and the customer network. The customer support service is routed through the GIF as depicted by routers 130 and servers 129. Therefore, when a customer accesses the GIF from any worldwide location and elects to use customer support, the customer will be greeted by the same format as would be available from an in-branch distribution point. In addition, as the GIF has televideo conference capabilities, the customer can directly, visually, vocally and instantly communicate with a customer service representative face to face. As the GIF allows the customer service representative to instantly access the customer's records while communicating with the customer, the representative is given the opportunity to compile the customer's demographic information while conducting face to face teleconferencing.

Figure 11:
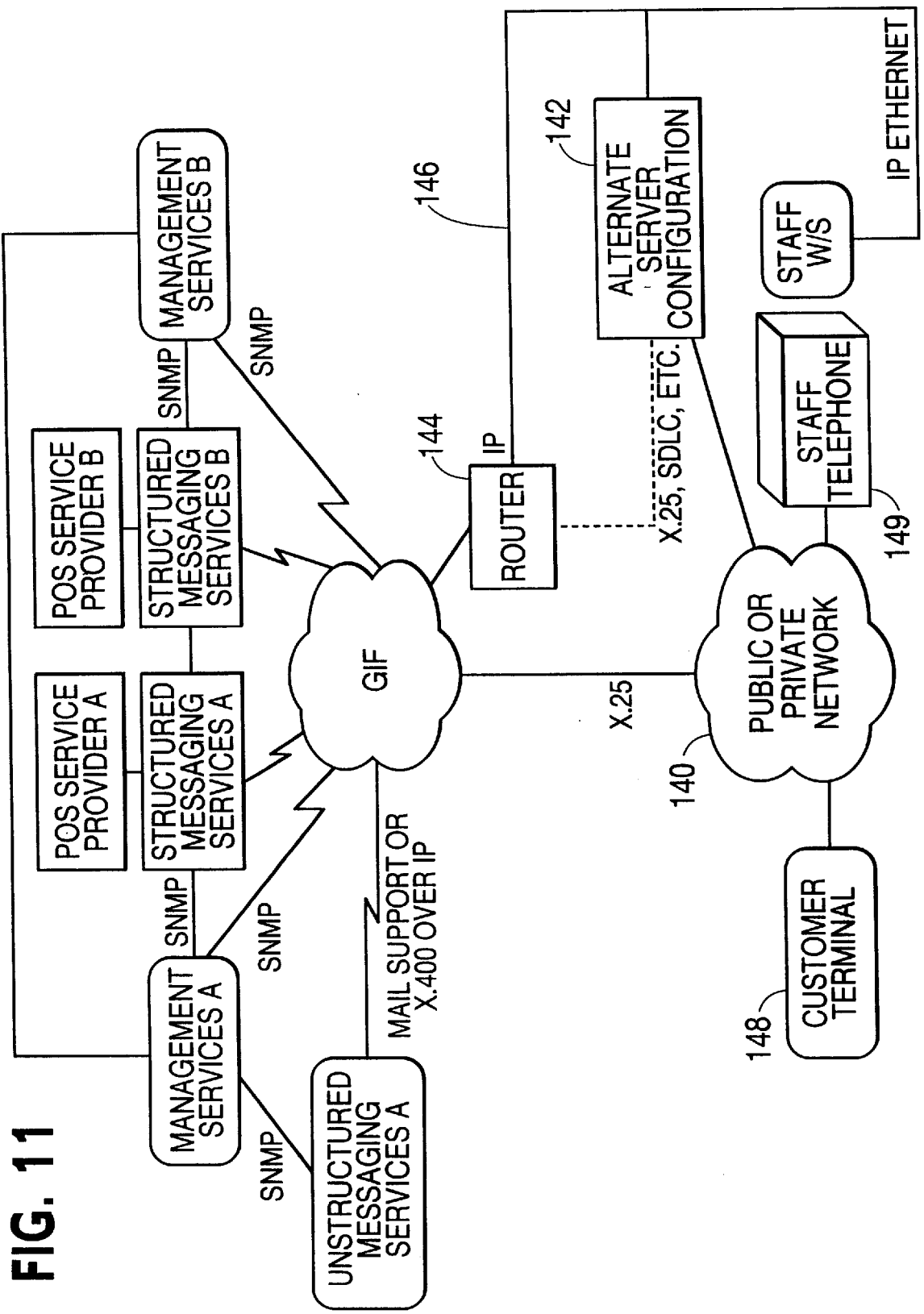
FIG. 11 depicts the topology of a point of sale configuration and communication links between the configuration and the GIF.

The GIF is also accessible from a point of sale (POS) location, including merchants conducting credit card sales and/or inquiring about the credit rating of a potential customer. The general topology of a POS is disclosed in FIG. 11. A private network 140 with an alternate server configuration 142 in place of a public network may be used to access the GIF. The alternate server is in direct communication with the GIF through a router 144 as depicted by line 146. However, the alternate server is not restricted to direct communication and can incorporate any communications means known to one skilled in the art to facilitate electronic communication between two networks. In addition to communicating with server 142, network 140 maintains customer terminals 148 and staff telephones 149. Network 140 serves the needs of the direct sales provider as well as merchant terminal that facilitates cash withdrawals and other financial transactions.

Figure 12:
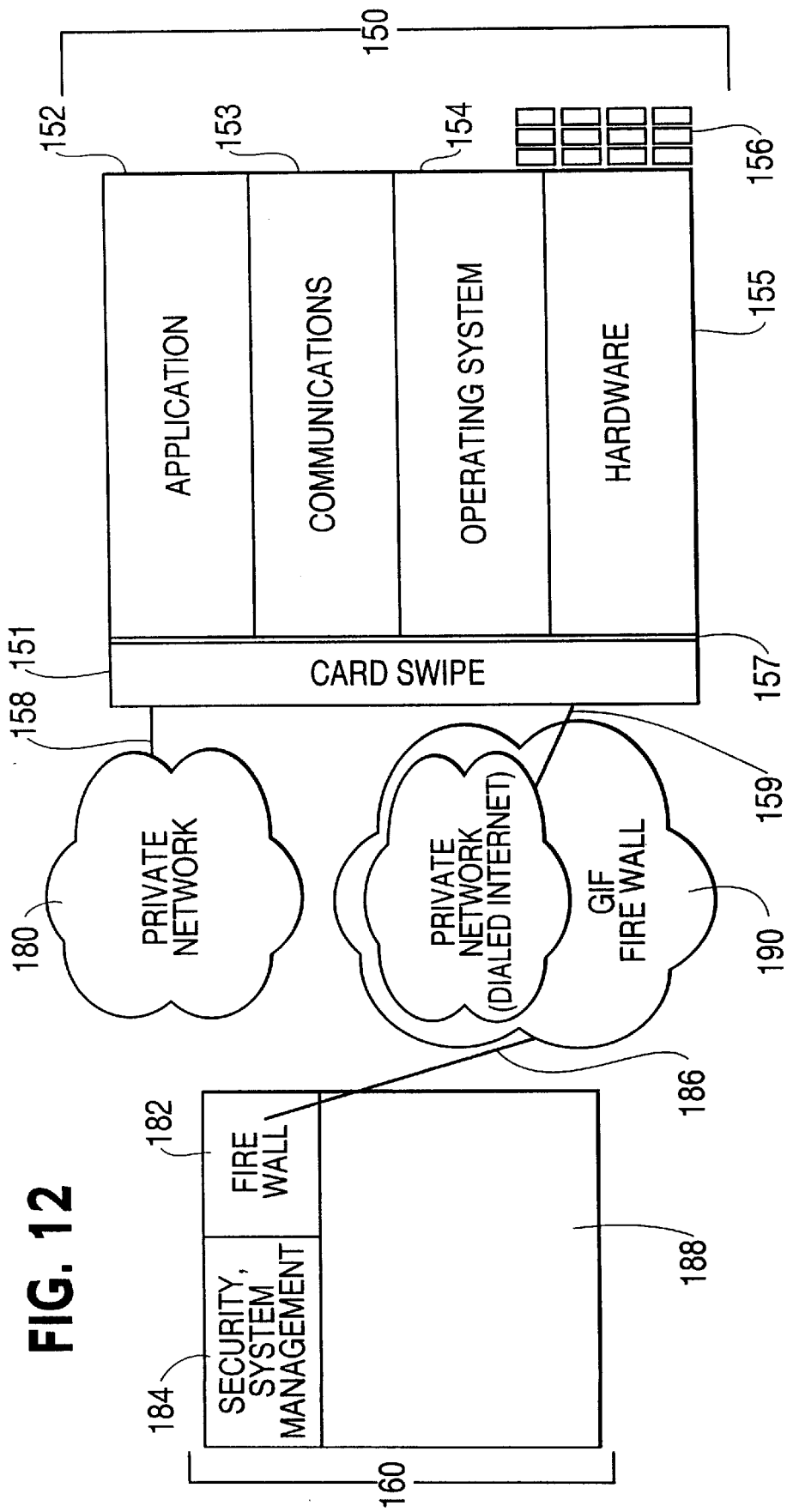
FIG. 12 depicts a point of sale server and workstation.

By way of example, a POS server and workstation are depicted in FIG. 12. It should be appreciated that similar architectural can be used to facilitate home access.

In addition, those skilled in the art will appreciate that use of public Internet in connection with POS transactions involves a host of security concerns. As shown, a terminal device 150 is in electrical communication with a POS server 160 via a private network 180 owned by the server or a public network 190 such as the Internet. The terminal device 150 may comprise any terminal device known to one skilled in the art that can accept a credit card or the like which conveys information via a magnetic strip or key pad. The terminal device is intended to be used directly by the end user at the point of sale and may be commonly found at most any transaction point. The use of magnetic stripe credit and debit cards have become so popular so as to arise at such varied locations as the gas station pump and the law firm.

As depicted, the terminal device 150 comprises a card swipe 151, software application 152, communications application 153, operating system 154, hardware 155 and keypad 156. The card swipe 151 accommodates the credit card or the like as the card is swiped across a magnetic strip reader 157. The magnetic strip reader 157 is in electrical communication with the software application 152 so as to facilitate software reading of information carried on the read magnetic strip. Operation of the software 152 is facilitated by operating system 154 as stored on the terminal's hardware 155. In addition to software, the operating system also facilitates communications software 153 that enables the device to send and receive information from a network. The link between the device and a network may comprise any communication software known to one skilled in the art for facilitating electronic communication between a terminal device and a network. In addition to facilitating reading and communicating software, the operating system facilitates information input via key pad 156.

As depicted in FIG. 12, the terminal device may be in direct communication with: a private network 180; a public network 190; or both networks. A private network is one completely run by a private concern. An example of a private network is one operated by VISA Corporation wherein, a terminal device accesses a VISA controlled server through a VISA controlled network. The VISA server then communicates with the GIF to access financial information and services therethrough. As the entire communication process between the terminal device and the GIF are controlled by VISA there is less concern for the integrity and security of the process. In contrast, a public network may be accessed by anyone in the general public. Examples of public networks include the Internet and dial up networks. Public networks raise issues of integrity and security regarding financial transactions communications. To address these concerns, the public network 190 includes a firewall about the network to prevent unauthorized usage and insure network integrity. In addition, when the public network communicates with a POS server, as depicted by line 186 into interface 188, a second firewall 182 within the server receives the public network communication. In addition, system security management 184 also maintains communication with the public network. The latter security measures are intended to provide an extra level of protection against unauthorized uses and communications.

The terminal device is in direct electrical communication by lines 158 and 159 to a private network 180 and a public network 190 as depicted. Both networks are in direct electrical communication with a POS server 160. The POS server then provides communication with the GIF (not shown). In addition to communications means, the server provides file managing services as well as communications with third parties and customer service representatives.

Figure 13:
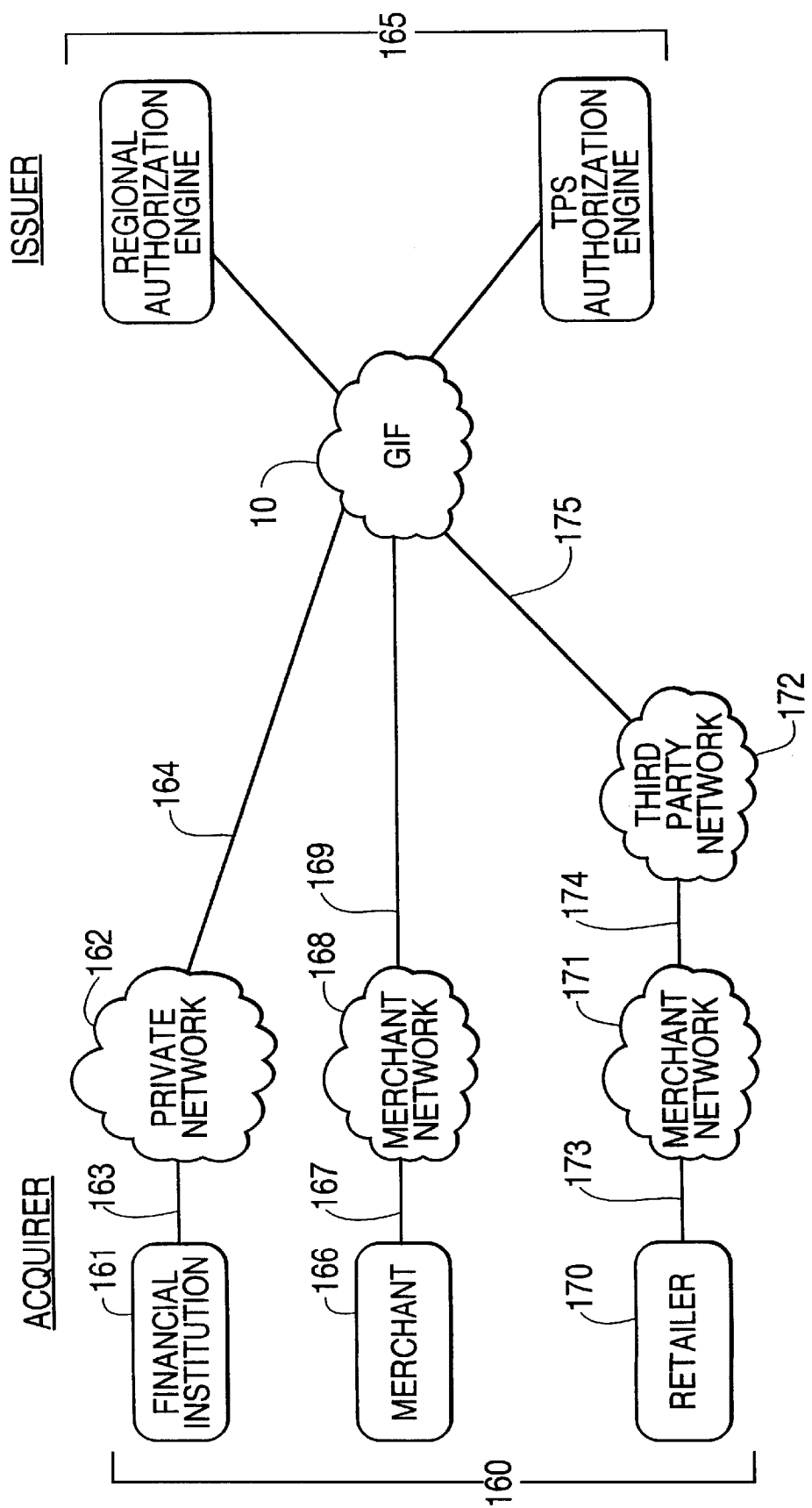
FIG. 13 depicts examples of private and public networks.

Examples of private and public networks, accessed by terminals, communicating with the GIF and services provided thereby are depicted in FIG. 13. As depicted, terminal 160 is in electrical communication with numerous networks before communicating with the GIF 10. A first terminal 161 may be operated by a financial institution and communicates with a private network 162 as depicted by line 163. The private network 162 may be operated by financial concerns such as CIRRUS or NYCE. The private network 162 communicates with the GIF as depicted by line 164. Once connected to the GIF, the private network has access to all of the GIF services including, but not limited to, authorization engines 165.

A second terminal 166 may be operated by a merchant. Second terminal 166 is in direct communication as depicted by line 167 with a merchant network 168. An example of a merchant network includes PUBLIX. Merchant network 168 communicates with the GIF as depicted by line 169. Once connected to the GIF, the merchant network has access to all of the GIF services including, but not limited to, authorization engines 165.

A third terminal 170 may be operated by any third party member. Third terminal 170 communicates with a merchant network 171 as depicted by line 173. Merchant network then communicates with a third party network 172 as depicted by line 174 to gain access to the GIF as depicted by line 175. Once connected to the GIF, the merchant network has access to all of the GIF services including, but not limited to, authorization engines 165.

Although depicted as involving a single network or domestic merchant, the GIF may be communicated with through any combination of domestic or international networks as may be envisioned by one skilled in the art, provided the network(s) involved can maintain communication capabilities. Examples of international networks include the Internet and MAESTRO.

We claim:

1. A global communications network for use by a financial institution, the global communications network including a plurality of local area networks; a plurality of distribution points for allowing access to the global communications network; a plurality of service providers for providing information in response to data level commands; and an integration facility for decomposing high level business language requests into data level commands that are understandable by the service providers so as to allow end users located at distribution points to relay information to and receive information from the network, the integration facility comprising:

means for determining whether an information request is simple or complex;

means for receiving information requests from a distribution point and relaying-information the requests received from a distribution point to the logical router for determination of whether the request is simple or complex;

a router for routing simple requests to a service provider that can satisfy the distribution point's request;

means for generating a message relating to the satisfaction of the request;

a router for routing messages relating to the satisfaction of the request back through the network to the originating distribution point;

a plurality of messaging service agents, each messaging service agent including means for consulting script and workflow data model rules, and sending messages to logical servers which determine which service provider is appropriate to receive the complex request;

means for routing complex requests to messaging service agents, which consult script and workflow data model rules, send one or more messages to logical servers which determine which service provider is appropriate to receive the complex request;

a router for routing complex requests to the appropriate service provider which performs the request;

means for allowing information relating to the satisfaction of the request to be exchanged between the distribution point and the service provider until the request is satisfied;

means for generating a message relating to the satisfaction of the request;

a router for routing messages relating to the satisfaction of the request back through the network to the originating distribution point.

2. The global communications network of claim 1, wherein the integration facility of claim 1, further comprising:

means for maintaining a system journal of all requests, simple and complex, that the network routes between distribution points and service providers.

3. The global communications network of claim 1, wherein the integration facility, further comprising:

a replication data center in communication with the network, the data replication center including:

a plurality a geographically separate electronic databases for storing data necessary to perform the simple and complex requests;

means for posting transactions in real time on each of the plurality of the geographically separate electronic databases so that the electronic databases are always kept in lockstep.

4. The global communications network of claim 1, further comprising a public network having a firewall that includes means for limiting access to the public network to authorized users.

5. The global communications network of claim 4, further comprising means for allowing a customer to directly connect to the public network through the firewall using a computer modem.

6. The global communications network of claim 4, further comprising a remote delivery server for providing access to the integration facility of the global communications network's banking products and services and means for allowing a customer to directly connect to a remote delivery server using a computer modem, wherein the customer is provided with a messaging scheme that is identical to the messaging scheme the customer would receive from an in-branch connection with the integration facility of the global communications network.

7. The global communications network of claim 4, further comprising means for allowing a customer to directly connect to the public network through the firewall over a voice telephone.

8. The global communications network of claim 4, further comprising means for allowing a customer to directly connect to the public network through the firewall using a personal digital assistant.

9. The global communications network of claim 1, further comprising a plurality of financial institution branch systems and a branch server and a branch router for routing messages to and from integration facility of the global communications network such that the integration facility of the global communications network is in electrical communication with the financial institution branch systems.

10. The global communications network of claim 9, wherein the branch systems further comprising an in-branch workstation and an in-branch self-service station.

11. The global communications network of claim 9, wherein the branch systems further comprising a branch network and a plurality of branch services connected to the branch network the services, including a printer, an automated teller, a customer activated services terminal, a staff workstation and a terminal server.

12. The global communications network of claim 11, wherein the plurality of branch services connected to the branch network further comprise express deposit devices, teller work stations, greeter workstations and investment consultant work stations.

13. The global communications network of claim 11, wherein all branch services share a common local area network and are located within a branch of the financial services provider such that each of the services enjoys access to the same computer financial applications; related computer applications; and common routes and servers to the integration facility of the global communications network.

14. The global communications network of claim 11, wherein the branch network is electronically connected to a public network which in turn is connected via router to the integration facility of the global communications network.

15. The global communications network of claim 11, wherein the branch network is electronically connected to the integration facility of the global communications network via a dedicated non-public router.

16. A global communications network for use by a financial institution, the global communications network that includes an integration facility for decomposing high level business language requests into data level commands that are understandable by the service providers so as to allow end users located at distribution points to relay information to and receive information from the network; the global communications network comprising:

a plurality of distribution points in electronic communication with the integration facility of the global communications network;

a plurality of service providers;

a first network in electronic communication with the integration facility;

a first messaging service;

a second messaging service; and a second network;

the first and second networks including means for routing electronic messages to and from external end users, via logical routers, according to a determination of which type of message is being routed; and the first and second messaging services including means for supervising the transactions requested based upon script, workflow, and data model rules;

whereby in operation, the messaging services handle structured requests from distribution points by decomposing, processing, recomposing and reversing the messages according to a set of business rules and processing scripts;

means for routing the messages to the appropriate service provider based on routing criteria developed from data partitioning, load balancing, site availability and the like.

17. The global communications network of claim 16, further comprising structured messaging means, wherein each distribution point is in electronic communication with a first logical router, the first logical router including means for determining whether the message is simple or complex, whereby if the message is determined to be simple the message is routed along a first path to the appropriate service provider and if the message is found to be complex, the message is directed along a second path to a messaging services agent; wherein the messaging services agent processes the message using, among other criteria, the script/workflow data model rules and then directs the complex message to second logical router; the second logical router including means for directing the complex message to the appropriate service provider.

18. The global communications network of claim 16, further comprising unstructured messaging means, wherein each distribution point is in electronic communication with a first logical router, the first logical router including means for determining whether the message is simple or complex (i.e. requiring supervision); whereby if the message is determined to be simple (not needing supervision) the message is routed along a first path to the appropriate service provider and if the message is found to be complex (requiring supervision), the message is directed along a second path to a mail agent; wherein the mail agent processes the message using, among other criteria, the script/workflow data model rules and then directs the complex message to second logical router; the second logical router including means for directing the complex message to the appropriate service provider.

19. In a global communications network used by a financial institution that includes a plurality of local area networks; a plurality of distribution points for allowing access to the global communications network; and a plurality of service providers for providing information in response to data level commands; a process for decomposing high level business language requests into data level commands that are understandable by the service providers so as to allow end users located at distribution points to relay information to and receive information from the network, the process comprising the steps of:

receiving information requests from a distribution point and relaying information the requests received from a distribution point to the logical router for determination of whether the request is simple or complex;

routing simple requests to a service provider that can satisfy the distribution point's request;

generating a message relating to the satisfaction of the request;

routing messages relating to the satisfaction of the request back through the network to the originating distribution point;

decomposing complex requests into one or more messages;

determining which service provider is appropriate to receive the complex request;

routing complex requests to the appropriate service provider which performs the request;

exchanging information relating to the satisfaction of the request between the distribution point and the service provider until the request is satisfied;

generating a message relating to the satisfaction of the request;

routing messages relating to the satisfaction of the request back through the network to the originating distribution point.

20. The process of claim 19, further comprising the step of posting transactions in real time on each of the plurality of the geographically separate electronic databases so that the electronic databases are always kept in lockstep.

* * * * *